(12) United States Patent
Ishikawa et al.

(10) Patent No.: US 6,314,750 B1
(45) Date of Patent: Nov. 13, 2001

(54) HEAT PUMP AIR CONDITIONER

(75) Inventors: Hiroshi Ishikawa, Hazu-gun; Katsuya Kusano, Chita-gun; Kunio Iritani; Masaya Tanaka, both of Anjo; Keita Honda, Okazaki, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/567,495

(22) Filed: May 8, 2000

(30) Foreign Application Priority Data

| May 13, 1999 | (JP) | ................................................. 11-133167 |
| Mar. 21, 2000 | (JP) | ................................................. 12-083264 |

(51) Int. Cl.[7] .................................................... F25B 13/01
(52) U.S. Cl. ......................... 62/324.1; 62/129; 62/324.6; 62/228.1
(58) Field of Search ................................. 62/176.3, 193, 62/228.1, 239, 324.1, 324.4, 324.6, 129, 174

(56) References Cited

U.S. PATENT DOCUMENTS

| 5,214,918 | * | 6/1993 | Oguni et al. .............................. 62/56 |
| 5,388,421 | * | 2/1995 | Matsuoka ................. 62/209 |

FOREIGN PATENT DOCUMENTS

| A-55-150462 | 11/1980 | (JP) . |
| A-58-152187 | 9/1983 | (JP) . |
| A-62 155472 | 7/1987 | (JP) . |
| A-2-17370 | 1/1990 | (JP) . |
| 4-113172-A | * | 4/1992 | (JP) ................................... 62/324.1 |
| A-9-152199 | 6/1997 | (JP) . |

* cited by examiner

Primary Examiner—Henry Bennett
Assistant Examiner—Melvin Jones
(74) Attorney, Agent, or Firm—Harness, Dickey & Pierce, PLC

(57) ABSTRACT

A heat pump air conditioner has a heat exchanger, a separator for separating refrigerant discharged from the heat exchanger into gas refrigerant and liquid refrigerant, and a compressor. Gas refrigerant in the separator is sucked into the compressor through a gas suction pipe. Oil-dissolved liquid refrigerant in the separator is also sucked through an oil return hole formed at a bottom of the gas suction pipe into the compressor. At the time of starting the air conditioner, when it is judged that a surface of liquid refrigerant in the separator is rapidly lowered to the oil return hole, a rotational speed of the compressor is controlled so that an amount of refrigerant discharged from the compressor is decreased. As a result, the surface of liquid refrigerant is kept higher than the oil return hole, and oil shortage of the compressor is restricted.

25 Claims, 22 Drawing Sheets

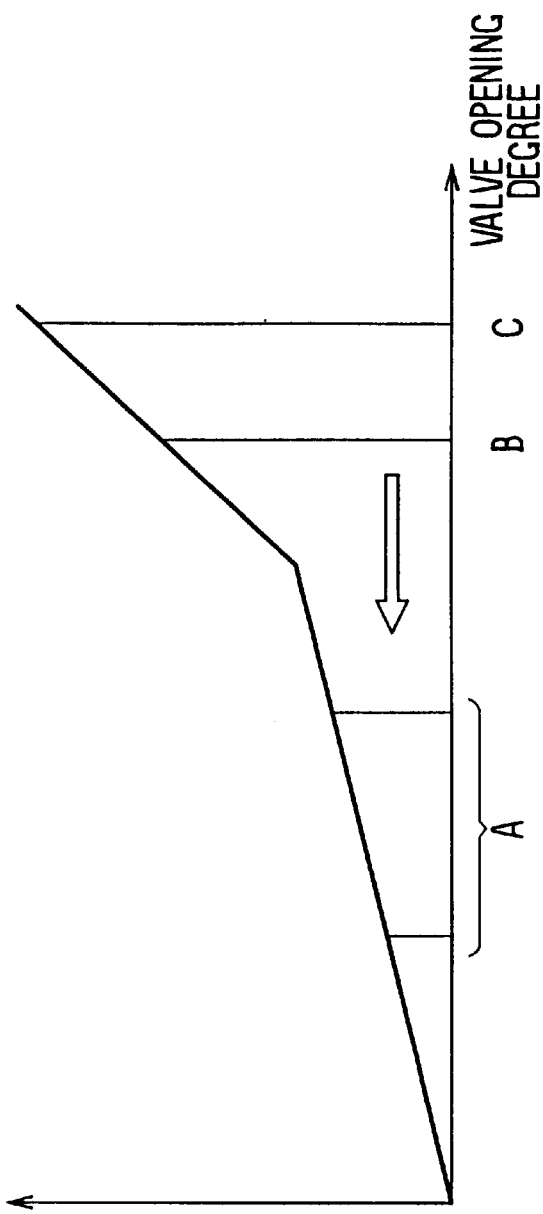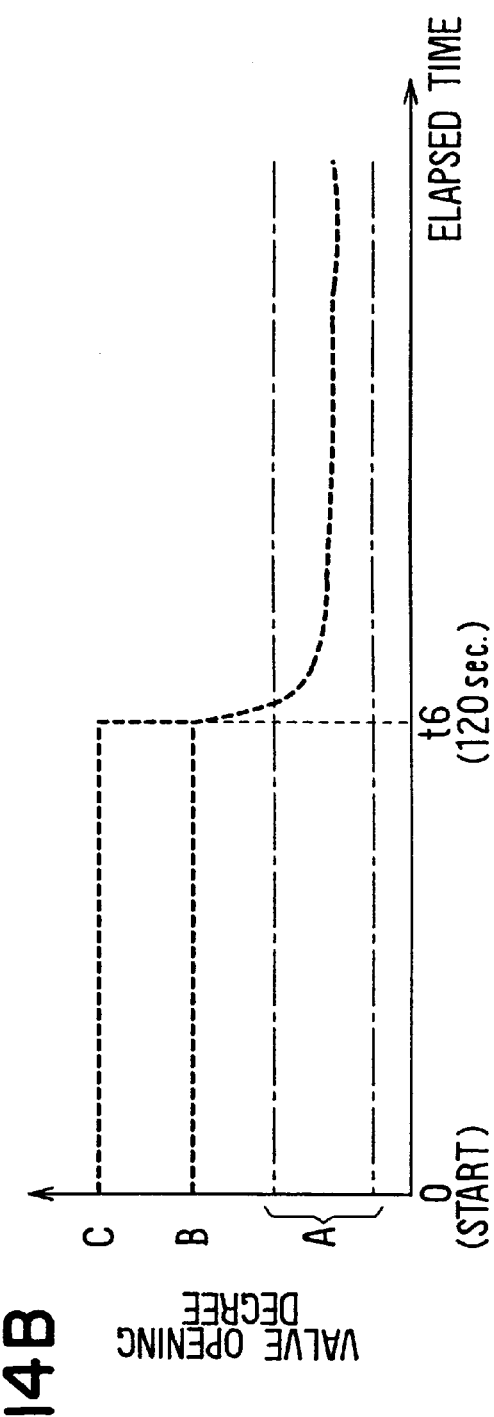
FIG. 14A
FIG. 14B

FIG. 18

HEIGHT OF LIQUID SURFACE (mm)

NORMAL CONTROL h3 ─────────────

INCREASE RESTRICTION CONTROL h2 ─────────────
h1 ─
      DECREASE CONTROL

| ΔT (Tam−Tho) | C1 |
|---|---|
| 0 | 1 |
| 5 | 0.8 |
| 10 | 0.7 |
| 15 | · |
| · | · |
| · | · |

FIG. 20

| HEIGHT OF LIQUID SURFACE | C2 |
|---|---|
| h1 | 0.5 |
| h2 | 0.6 |
| h3 | 0.7 |
| · | · |
| · | · |
| · | · |

HEAT PUMP AIR CONDITIONER

CROSS REFERENCE TO RELATED APPLICATIONS

This application relates to and claims priority from Japanese Patent Applications Nos. 11-133167 filed on May 13, 1999 and 2000-83264 field on Mar. 21, 2000, the contents of which are hereby incorporated by reference.

BACKGROUND OF THE INVENTION

1. Field of the Invention

The present invention relates generally to air conditioners, and particularly to a heat pump air conditioner improved in returning lubricant oil to a compressor at the time of starting a refrigeration cycle. The present invention is suitably applied to a heat pump air conditioner for an electric vehicle.

2. Related Art

Conventionally, a heat pump air conditioner for a vehicle has an outside heat exchanger disposed outside a passenger compartment of the vehicle, an inside heat exchanger disposed inside the passenger compartment, a compressor and a separator. The separator is disposed at a suction side of the compressor for separating refrigerant into gas refrigerant and liquid refrigerant and storing liquid refrigerant therein. In a heating mode, the air conditioner releases heat absorbed by the outside heat exchanger and heat corresponding to an amount of a compression work performed by the compressor into air by the inside heat exchanger, thereby heating the air.

Gas refrigerant in the separator is sucked into the compressor through a gas suction pipe. The gas suction pipe has an oil return hole proximate a bottom of the separator so that oil-dissolved liquid refrigerant is sucked through the oil return hole and introduced into the compressor. As a result, a mixture of gas refrigerant and oil-dissolved liquid refrigerant is introduced into the compressor, and a sufficient amount of oil returned to the compressor.

However, when the vehicle having the heat pump air conditioner has been left at a low temperature such as $-10°$ C. or lower after the air conditioner was stopped, it takes long time for a temperature of the inside heat exchanger to decrease to the same level as a temperature of air outside the passenger compartment (hereinafter referred to as outside air temperature). On the other hand, a temperature of the outside heat exchanger decreases to the same level as the outside air temperature in a short time. Therefore, a saturation pressure of refrigerant flowing through the inside heat exchanger becomes higher than that of refrigerant flowing through the outside heat exchanger.

As a result, while the air conditioner is stopped, refrigerant in the inside heat exchanger flows into the outside heat exchanger through a decompression device such as a capillary tube and stay therein. Therefore, since only little liquid refrigerant and a small amount of gas refrigerant exists on an upstream refrigerant side of the capillary tube, gas refrigerant passes through the capillary tube when the air conditioner is restarted.

However, since a diameter of the capillary tube is set relatively small for a steady-state operation of a refrigerant cycle of the air conditioner, the diameter may become too small for rapidly increasing a flow rate of refrigerant in the refrigeration cycle when starting the air conditioner with the outside air temperature being low. Further, since gas refrigerant passes through the capillary tube less easily than liquid refrigerant, a flow rate of refrigerant in the refrigeration cycle may become too small for an amount of refrigerant discharged from the compressor.

As a result, a suction pressure of the compressor is rapidly decreased as a rotational speed of the compressor is increased at the time of restarting the air conditioner. This causes rapid vaporization or foaming of liquid refrigerant in the separator, and liquid refrigerant in the separator is instantaneously discharged to the suction side of the compressor. Therefore, a surface of liquid refrigerant in the separator may rapidly lowered to become below the oil return hole temporarily, causing that no oil returns from the separator to the compressor temporarily. As a result, the compressor may suffer from oil shortage to have poor lubrication, thereby adversely affecting a durability of the compressor.

The above-described decrease in an amount of oil returning to the compressor occurs even when a sealed amount of the refrigerant in the refrigeration cycle is sufficient in a steady state. Further, when the outside air temperature is lower, or the sealed amount of refrigerant in the cycle is smaller, or the air conditioner is left for a longer time, the amount of oil returning to the compressor is lesser and the oil shortage of the compressor lasts longer.

The amount of oil returning to the compressor may also be decreased in a cooling mode. When the heat pump air conditioner is operated in the cooling mode and is stopped to be left while the outside air temperature is relatively high in summer, the outside heat exchanger is maintained at a high temperature due to the high outside air temperature. On the other hand, the inside heat exchanger is maintained at a relatively low temperature.

As a result, while the air conditioner is stopped, a saturation pressure of refrigerant in the outside heat exchanger becomes higher than that of refrigerant in the inside heat exchanger. Therefore, refrigerant in the outside heat exchanger flows into the inside heat exchanger through a decompression device such as a capillary tube and stay therein. As a result, only little liquid refrigerant and a small amount of gas refrigerant exists on an upstream refrigerant side of the capillary tube. Therefore, when the cooling mode is restarted, a suction pressure of the compressor is rapidly decreased as a rotational speed of the compressor is increased at the time of restarting the compressor similarly to the heating mode. This causes a rapid vaporization or foaming of liquid refrigerant in the separator, and no oil returns from the separator to the compressor temporarily.

Especially, when a deviation rate of a rotational speed of the compressor is increased at the time of starting the cooling mode to improve cooling performance of the air conditioner, the amount of oil returning to the compressor is further decreased.

SUMMARY OF THE INVENTION

In view of the foregoing problems, it is an object of in the present invention to provide a heat pump air conditioner having a compressor, in which a sufficient amount of oil is returned to the compressor for lubrication to increase durability of the compressor.

According to the present invention, a heat pump air conditioner has a compressor for compressing and discharging refrigerant, a first heat exchanger for radiating heat of gas refrigerant discharged from the compressor, a decompressing unit for decompressing refrigerant having passed through the first heat exchanger, a second heat exchanger for evaporating refrigerant having passed through the decompressing unit, a separator f or separating refrigerant having passed through the second heat exchanger into gas refrigerant and liquid refrigerant and storing liquid refrigerant therein, and a control unit for controlling an operation of the compressor.

The separator has a gas suction pipe through which gas refrigerant in the separator is sucked into the compressor. The gas suction pipe has an oil return hole through which oil-dissolved liquid refrigerant is sucked and mixed with gas refrigerant to be returned into the compressor. The oil return hole is formed at a bottom of the gas suction pipe. The control unit has judging means f or judging whether a specific condition that a surf ace of the liquid refrigerant in the separator is rapidly lowered toward the oil return hole is satisfied. The control unit decreases an amount of the refrigerant discharged from the compressor to a value smaller than that in a normal state at the time of starting the compressor, when the judging means judges that the specific condition is satisfied.

As a result, a suction pressure of the compressor is restricted from rapidly decreasing at the time of starting the compressor. Therefore, the surface of liquid refrigerant in the separator is restricted from being lower than the oil return a hole, and oil-dissolved liquid refrigerant is sufficiently sucked through the oil return hole to be returned to the compressor. As a result, oil shortage of the compressor is restricted and durability of the compressor is improved.

Preferably, the compressor is an electric compressor which adjusts an amount of the refrigerant discharged therefrom by adjusting a rotational speed thereof. The control unit decreases a deviation rate of the rotational speed of the compressor to a value smaller than that in the normal state at the time of starting the compressor, when the judging means judges that the specific condition is satisfied.

BRIEF DESCRIPTION OF THE DRAWINGS

This and other objects and features of the present invention will become more readily apparent from a better understanding of the preferred embodiments described below with reference to the accompanying drawings, in which:

FIG. 14A is a graph showing a relationship between an opening degree of an expansion valve of the air conditioner and a flow rate of refrigerant in a refrigeration cycle of the air conditioner according to the fourth embodiment;

FIG. 14B is a graph showing a relationship between elapsed time since a start of a heating mode and the opening degree of the expansion valve according to the fourth embodiment;

FIG. 18 is a diagram showing a relationship between a control of a rotational speed of a compressor of the air conditioner and a height of a liquid refrigerant surface in a separator of the air conditioner according to the sixth embodiment;

FIG. 19 is a table showing a relationship between a temperature difference ΔT and a correction coefficient C according to a seventh preferred embodiment of the present invention;

FIG. 20 is a table showing a relationship between a height of a liquid refrigerant surface in a separator of a heat pump air conditioner and a correction coefficient C according to an eighth preferred embodiment of the present invention;

DETAILED DESCRIPTION OF THE PREFERRED EMBODIMENTS

First Embodiment

Preferred embodiments of the present invention will be described hereinafter with reference to the accompanying drawings.

Figure 1:
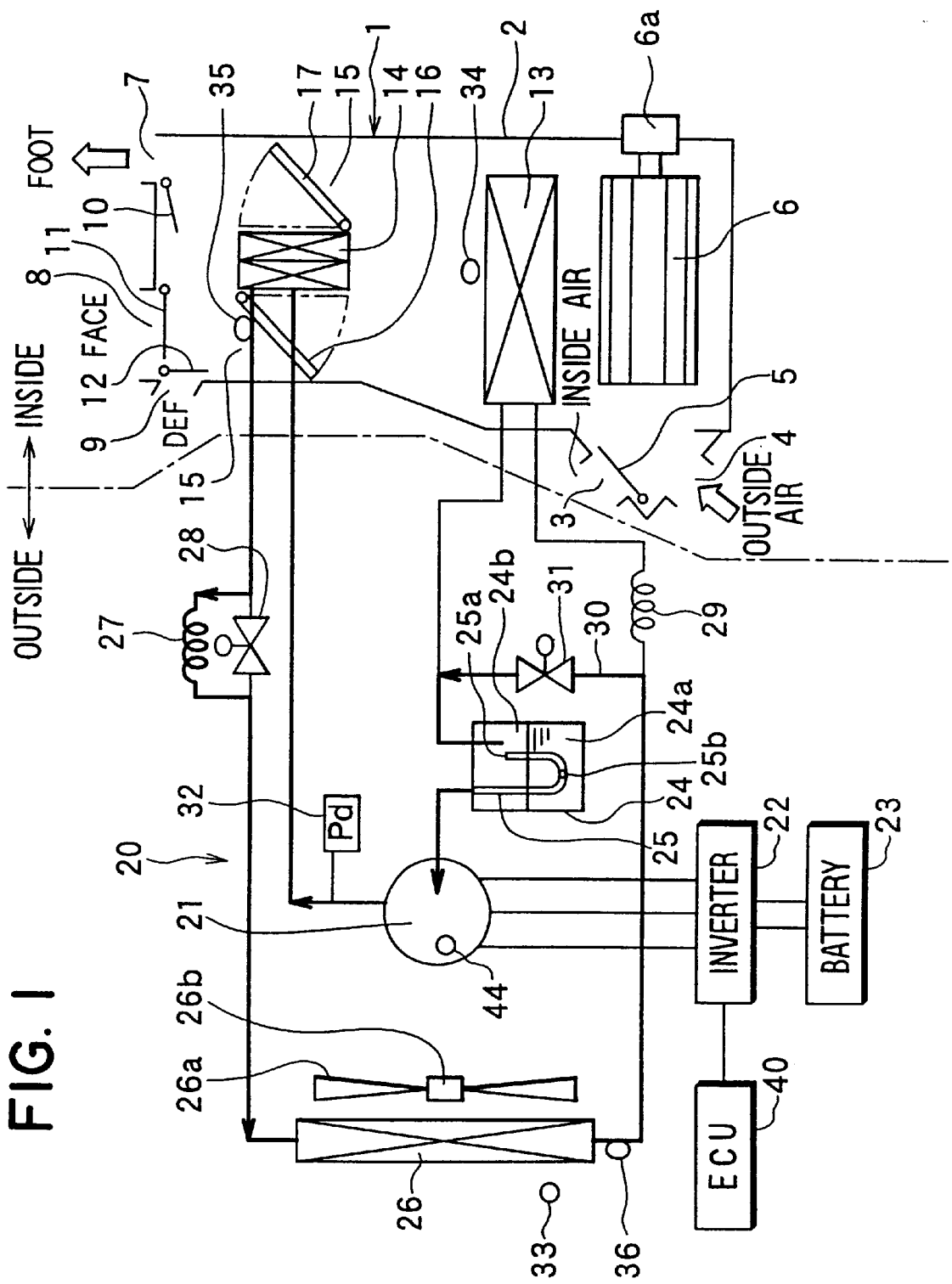
FIG. 1 is a schematic diagram showing a heat pump air conditioner in a heating mode according to a first preferred embodiment of the present invention.

A first preferred embodiment of the present invention will be described with reference to FIGS. 1–9. In the first embodiment, the present invention is applied to a heat pump air conditioner for an electric vehicle. As shown in FIG. 1, the air conditioner has an air conditioning unit 1. The air-conditioning unit 1 is disposed inside a passenger compartment of the electric vehicle and has an air-conditioning duct 2 which forms an air-flow passage through which conditioned air is introduced into the passenger compartment.

Air inside the passenger compartment (hereinafter referred to as inside air) is introduced into the duct 2 through an inside air inlet 3. Air outside the passenger compartment (hereinafter referred to as outside air) is introduced into the duct 2 through an outside air inlet 4. The inside air outlet 3 and the outside air outlet 4 are formed at one end of the duct 2, and are opened and closed in a switchable manner by an inside/outside air switching door 5. An electric blower 6 for blowing air into the duct 2 is provided adjacent to the inlets 3 and 4. The blower 6 is driven by a motor 6a.

A foot air outlet 7 for blowing conditioned air toward a foot portion of a driver/passenger in the passenger compartment, a face air outlet 8 for blowing conditioned air toward an upper body of the driver/passenger, and a defroster air outlet 9 for blowing conditioned air toward an inside surface of a windshield of the vehicle are formed at the other end of the duct 2. The air outlets 7–9 communicate with the passenger compartment and are opened and closed by air outlet mode doors 10–12, respectively.

A cooling evaporator 13 is provided in the duct 2 at a downstream air side of the blower 6. The cooling evaporator 13 is a heat exchanger disposed inside the passenger compartment as a part of a refrigeration cycle 20 of the air-conditioning unit 1. The cooling evaporator 13 functions as a cooling device for cooling or dehumidifying air flowing inside the duct 2 through heat absorbing action of refrigerant flowing through the cooling evaporator 13 in a cooling mode and a dehumidification mode. Further, a heating condenser 14 is provided in the duct 2 at a downstream air side of the cooling evaporator 13. The heating condenser 14 is a heat exchanger disposed inside the passenger compartment as a part of the refrigeration cycle 20. The heating condenser 14 functions as a heating device for heating air flowing through the duct 2 through heat releasing action of refrigerant flowing through the heating condenser 14 in a heating mode and the dehumidification mode.

The heating condenser 14 is disposed at a center of the duct 2 so that bypass passages 15 are formed on both sides of the heating condenser 14 in a left-right direction in FIG. 1. The manner of inflow of air into the heating condenser 14 or the bypass passages 15 is switched by two switching doors 16 and 17. More specifically, in the heating mode or the dehumidification mode, air is caused to flow into the heating condenser 14 by manipulating the switching doors 16 and 17 so that they are located at the positions indicated by solid lines in FIG. 1. In the cooling mode, the switching doors 16 and 17 are manipulated so as to be located at positions indicated by two-dot chain lines in FIG. 1, whereby inflow of air into the heating condenser 14 is interrupted and air passes through the bypass passages 15. In the cooling mode, the heating condenser 14 performs no heat exchange between refrigerant and air and hence functions as a mere refrigerant passage.

The refrigeration cycle 20 is formed as a heat pump refrigeration cycle that cools, heats and dehumidifies air blown into the passenger compartment using the cooling evaporator 13 and the heating condenser 14. The refrigeration cycle 20 also has an electric refrigerant compressor 21 and a separator 24. The compressor 21 incorporates an alternating current (AC) motor (not shown) in an integral manner in a sealed case. Driven by the AC motor, the compressor 21 sucks, compresses and discharges refrigerant. An AC voltage is applied to the AC motor of the compressor 21 from an inverter 22. A rotational speed of the AC motor is varied continuously by adjusting a frequency of the AC voltage of the inverter 22. A direct current (DC) voltage is applied to the inverter 22 from a vehicle battery 23.

The separator 24 is provided on a suction side of the compressor 21. The separator 24 separates gas/liquid two-phase refrigerant into gas refrigerant and liquid refrigerant and stores liquid refrigerant in a liquid refrigerant region 24a in a lower part of the separator 24. An U-shaped gas suction pipe 25 is provided in the separator 24 so that an end opening 25a of the gas suction pipe 25 exists in a gas refrigerant region 24b in an upper part of the separator 24. Gas refrigerant is sucked through the end opening 25a to flow through the gas suction pipe 25 into the compressor 21. A bottom of the gas suction pipe 25 is formed with a minute oil return hole 25b. The liquid refrigerant in the liquid refrigerant region 24a is sucked into the gas suction pipe 25 through the oil return hole 25b, mixed with the gas refrigerant and returned to the compressor 21. Since oil is dissolved in the liquid refrigerant, oil is also returned to the compressor 21 for lubrication.

Still referring to FIG. 1, in the refrigeration cycle 20, an outlet of the compressor 21 is connected to an inlet of the heating condenser 14. A capillary tube 27 as a decompressing unit for heating with a fixed opening degree and an electromagnetic valve 28 are provided in parallel between an outlet of the heating condenser 14 and an inlet of an outside heat exchanger 26 disposed outside the passenger compartment. Further, a capillary tube 29 as a decompressing unit for cooling with a fixed opening degree is provided between an outlet of the outside heat exchanger 26 and an inlet of the cooling evaporator 13. A bypass passage 30 is provided to directly connect the outlet of the outside heat exchanger 26 (i..e., the inlet of the capillary tube 29) to the inlet of the separator 24. An electromagnetic valve 31 is provided in the bypass passage 30. The outside heat exchanger 26 exchanges heat with outside air blown by an outside fan 26a. The outside fan 26a is driven by a motor 26b.

A high pressure sensor 32 is attached to a pipe connected to the outlet of the compressor 21. An outside air temperature sensor 33 is provided at an upstream air side of the outside heat exchanger 26. An evaporator temperature sensor 34 for detecting a temperature of air discharged from the evaporator 13 is provided at an immediately downstream air side of the evaporator 13. A compressor temperature sensor 44 is provided inside the compressor 21.

Figure 2:
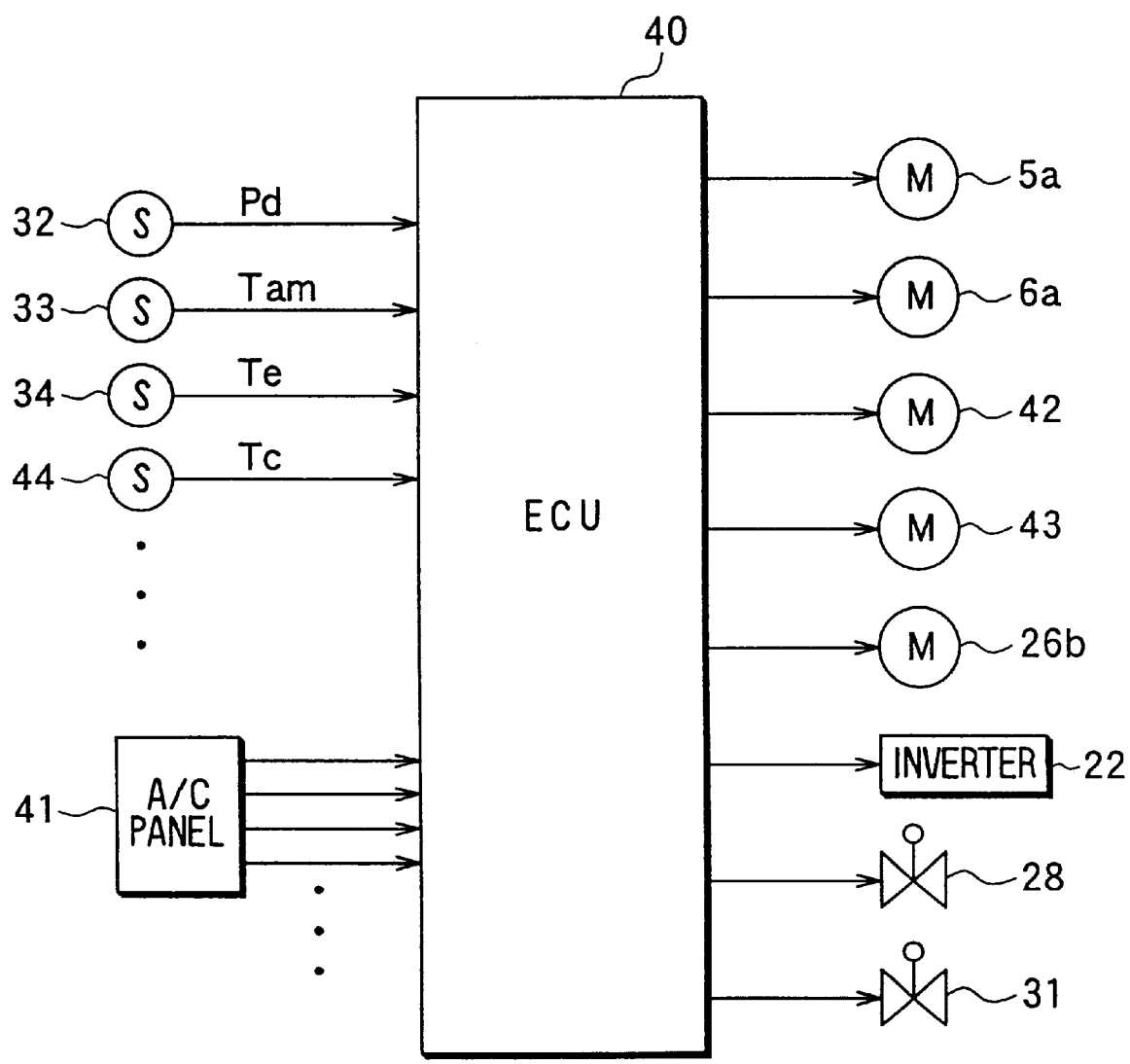
FIG. 2 is a block diagram showing a control system of the heat pump air conditioner according to the first embodiment.

As shown in FIG. 2, the air conditioner has an electronic control unit (ECU) 40 composed of a microcomputer and its peripheral circuits. The ECU 40 receives signals from the sensors 32–34, 44 which indicate a high pressure Pd of the refrigeration cycle 20 (hereinafter referred to as cycle high pressure Pd), an outside air temperature Tam, an evaporator temperature Te, a compressor temperature Tc and so on. Operation signals for a passenger compartment temperature control, inside/outside air suction mode switching, air blow amount switching of the blower 6, air outlet mode switching and so on are input to the ECU 40 by operation members such as levers and dials provided on a control panel 41 disposed in the vicinity of a driver's seat in the passenger compartment.

The ECU 40 energizes and controls a drive motor 5a of the inside/outside air switching door 5, the drive motor 6a of the blower 6, a drive motor 42 of the switching doors 16 and 17, a drive motor 43 of the air outlet mode doors 10–12, the drive motor 26b of the outside fan 26a, the inverter 22, the electromagnetic valves 28 and 31 and so on. The operation members provided on the control panel 41 includes a temperature control lever (not shown) for generating a operation signal indicating a target value of the passenger compartment temperature. The temperature control lever allows the driver to set the cooling mode, the dehumidification mode and the heating mode in turn as the driver moves the temperature control lever from a low-temperature side to a high-temperature side.

Figure 3:
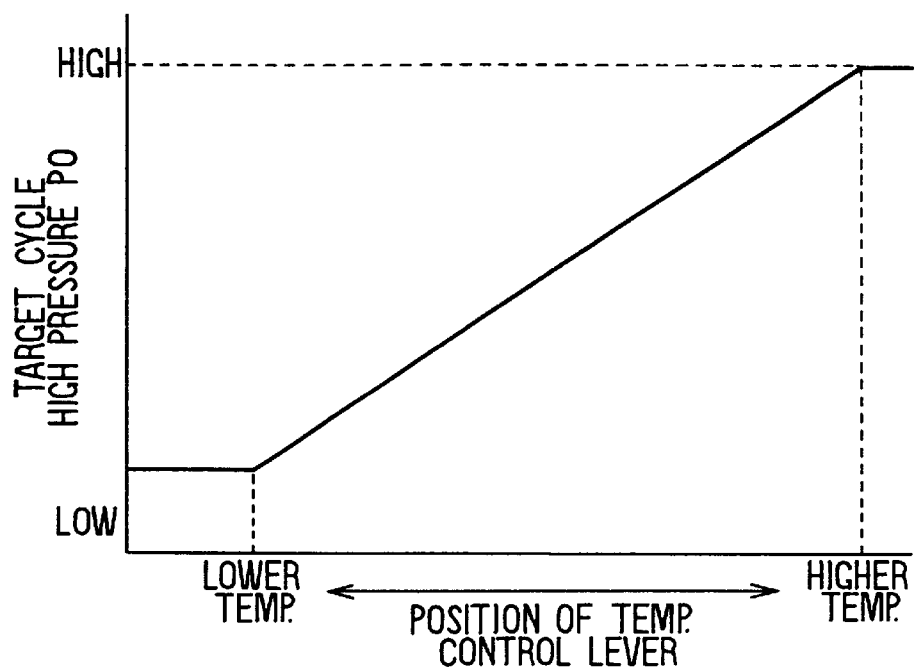
FIG. 3 is a graph showing a relationship between a position of a temperature control lever of the air conditioner and a target cycle high pressure PO in a heating/dehumidification mode according to the first embodiment.
Figure 4:
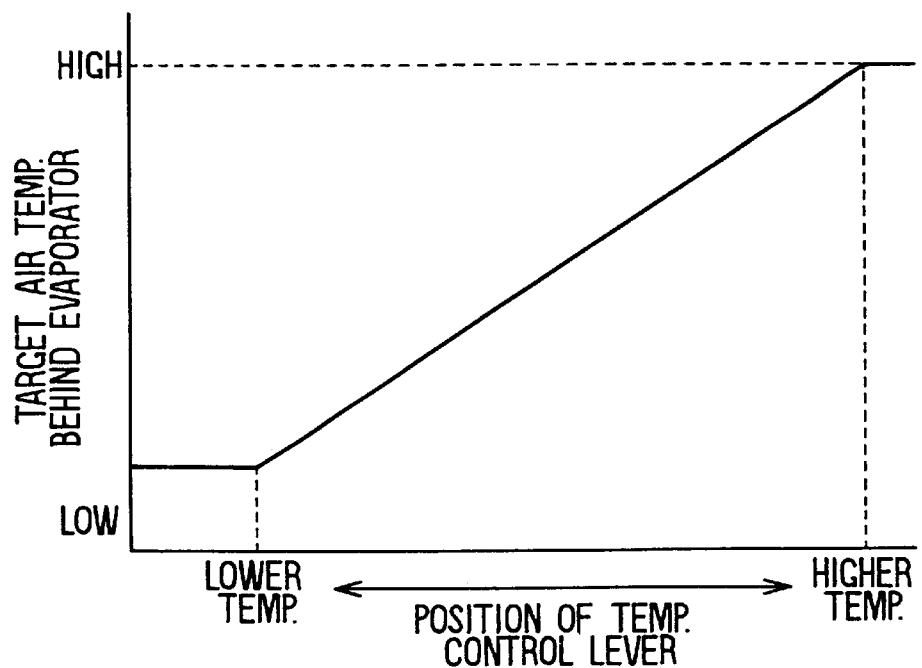
FIG. 4 is a graph showing a relationship between a position of the temperature control lever and a target air temperature behind an evaporator in a cooling mode according to the first embodiment.

As shown in FIG. 3, when the operation mode of the refrigeration cycle 20 is set to the heating mode or the dehumidification mode, a target cycle high pressure PO is set in accordance with a set position of the temperature control lever. As shown in FIG. 4, when the operation mode is set to the cooling mode, a target temperature of air discharged from the evaporator 13 is set in accordance with a set position of the temperature control lever.

Next, an operation of the air conditioner according to the first embodiment will be described. As shown in FIG. 1, when the air conditioner is in the heating mode, the electromagnetic valve 28 is closed and the electromagnetic valve 31 is opened by the ECU 40. The switching doors 16 and 17 are manipulated so as to be located at the positions indicated by the solid lines in FIG. 1, whereby the air passage of the heating condenser 14 is opened and the bypass passages 15 are closed. As a result, refrigerant flows through the refrigeration cycle 20 along a route indicated by thick solid lines in FIG. 1. The outside heat exchanger 26 functions as an evaporator and absorbs heat from outside air. The heating condenser 14 releases heat from high-temperature gas refrigerant to air flowing through the duct 2 and thereby heats the air. The resulting hot air is blown mainly from the foot air outlet 7 into the passenger compartment so that the passenger compartment is heated.

Figure 5:
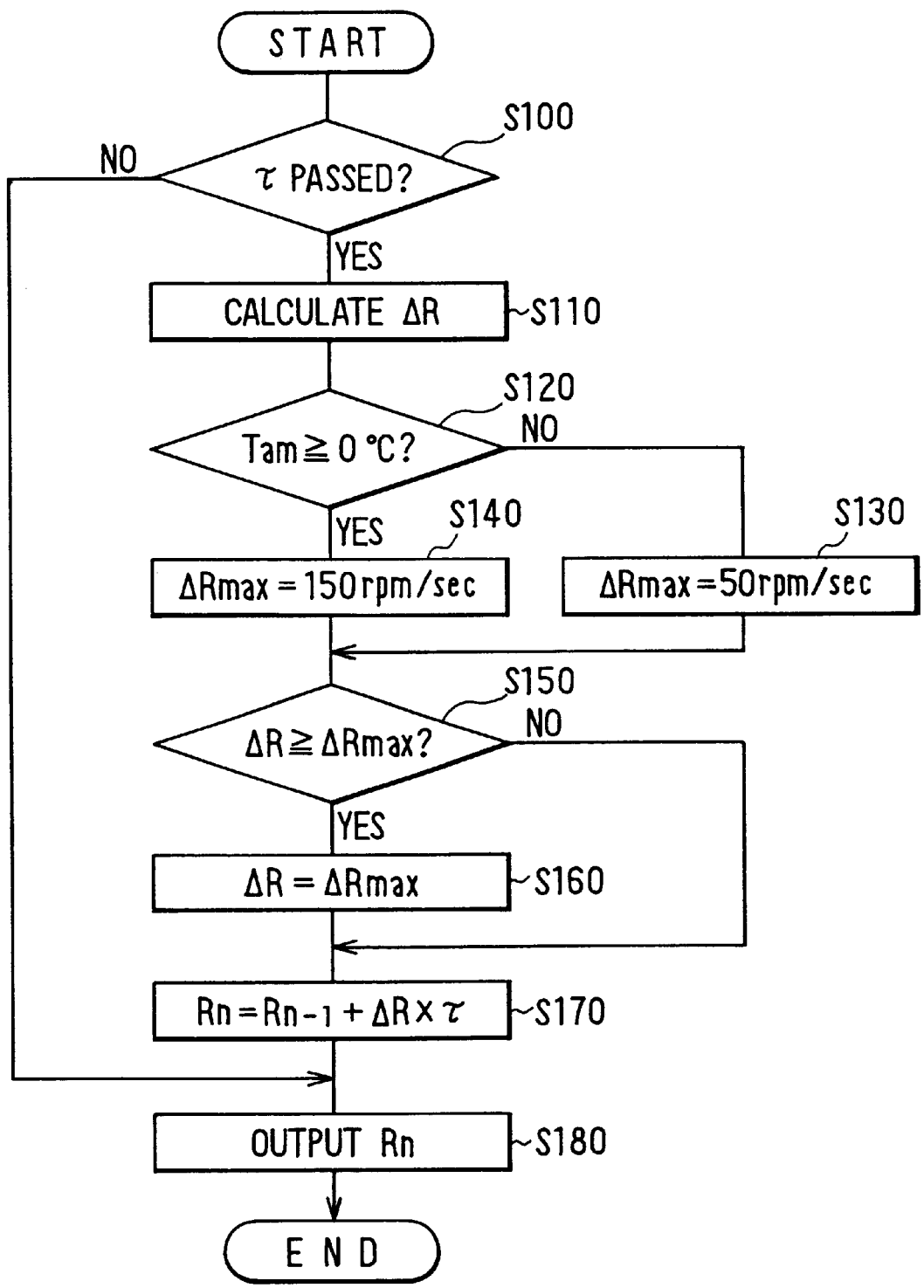
FIG. 5 is a flow diagram showing a control routine of a rotational speed of a compressor of the air conditioner according to the first embodiment.

When the heating mode is set according to a set position of the temperature control lever in the control panel 41, a control routine in FIG. 5 for controlling a rotational speed of the compressor 21 is started. At step S100, it is judged whether a predetermined cycle time τ (e.g., 1 sec.) has elapsed. If the judgment result at step S100 is yes, the process goes to step S110, where a deviation rate ΔR of a rotational speed of the compressor 21 is calculated in the following manner. That is, a deviation $E_n$ between a target cycle high pressure PO determined based on a set position of the temperature control lever according to FIG. 3 and an actual cycle high pressure Pd detected by the high pressure sensor 32 is calculated according to the following equation (1):

$$En = PO - Pd \quad (1)$$

Then, a deviation variation factor Edot is calculated according to the following equation (2):

ti $Edot = E_n - E_{n-1} + \text{tm}$ (2).

Since the deviation $E_n$ is updated every control cycle time τ (1 sec.), $E_{n-1}$ in Equation (2) is a value obtained one second prior to $E_n$. The deviation rate ΔR of the rotational speed of the compressor 21 is calculated based on the above deviation $E_n$ and the deviation variation factor Edot according to a membership function and a rule table stored in a ROM of the microcomputer in the ECU 40.

Next, the process goes to step S120, where it is judged whether the outside air temperature Tam is higher than or equal to a predetermined temperature (e.g., 0° C.). If the outside air temperature Tam is lower than the predetermined temperature, the process goes to step S130, where a maximum deviation rate ΔRmax of the rotational speed of the compressor 21 at the time of starting the compressor 21 is set to a first predetermined value (e.g., 50 rpm/sec.). If the outside air temperature Tam is higher than or equal to the predetermined temperature, the process goes to step S140, where the maximum deviation rate ΔRmax of the rotational speed of the compressor 21 at the time of starting the compressor 21 is set to a second predetermined value (e g., 150 rpm/sec.) which is sufficiently larger than the first predetermined value.

Then, the process goes to step S150, where the deviation rate ΔR calculated at step S110 is compared with the maximum deviation rate ΔRmax determined at step S130 or S140. If ΔR≧ΔRmax, the process goes to step S160, where ΔR is set to ΔRmax. If ΔR<ΔRmax, ΔR is used as it is. Further, the process goes to step S170, where a target rotational speed $R_n$ of the compressor 21 is calculated according to the following equation (3):

$$R_n = R_{n-1} + \Delta R \cdot \tau \quad (3)$$

Since the rotational speed $R_n$ of the compressor 21 is also updated every control cycle time τ (1 sec.), $R_{n-1}$ in the equation (3) is a value obtained one second prior to $R_n$. However, at the time of starting the compressor 21, $R_n$ is set to a unique value of 600 rpm, which is a minimum operational rotational speed of the compressor 21. Then, the process goes to step S180, where an instruction signal indicating the rotational speed $R_n$ of the compressor 21 is output to the inverter 22. The inverter 22 controls an actual rotational speed of the compressor 21 to the calculated rotational speed $R_n$.

According to the first embodiment, when the air conditioner is started while the outside air temperature Tam is low as 0° C. or lower, the maximum deviation rate ΔRmax of the rotational speed of the compressor 21 is restricted to the first predetermined value such as 50 rpm/sec. As a result, the suction pressure of the compressor 21 is restricted from being rapidly decreased as the rotational speed of the compressor 21 increases at the time of starting the compressor 21, whereby evaporation or foaming of liquid refrigerant in the separator 24 is restricted. Therefore, at the time of starting the compressor 21, a liquid refrigerant surface in the separator 24 is kept higher than the oil return hole 25b, whereby oil shortage of the compressor 21 is restricted and proper lubrication of the compressor 21 is secured.

Figure 6:
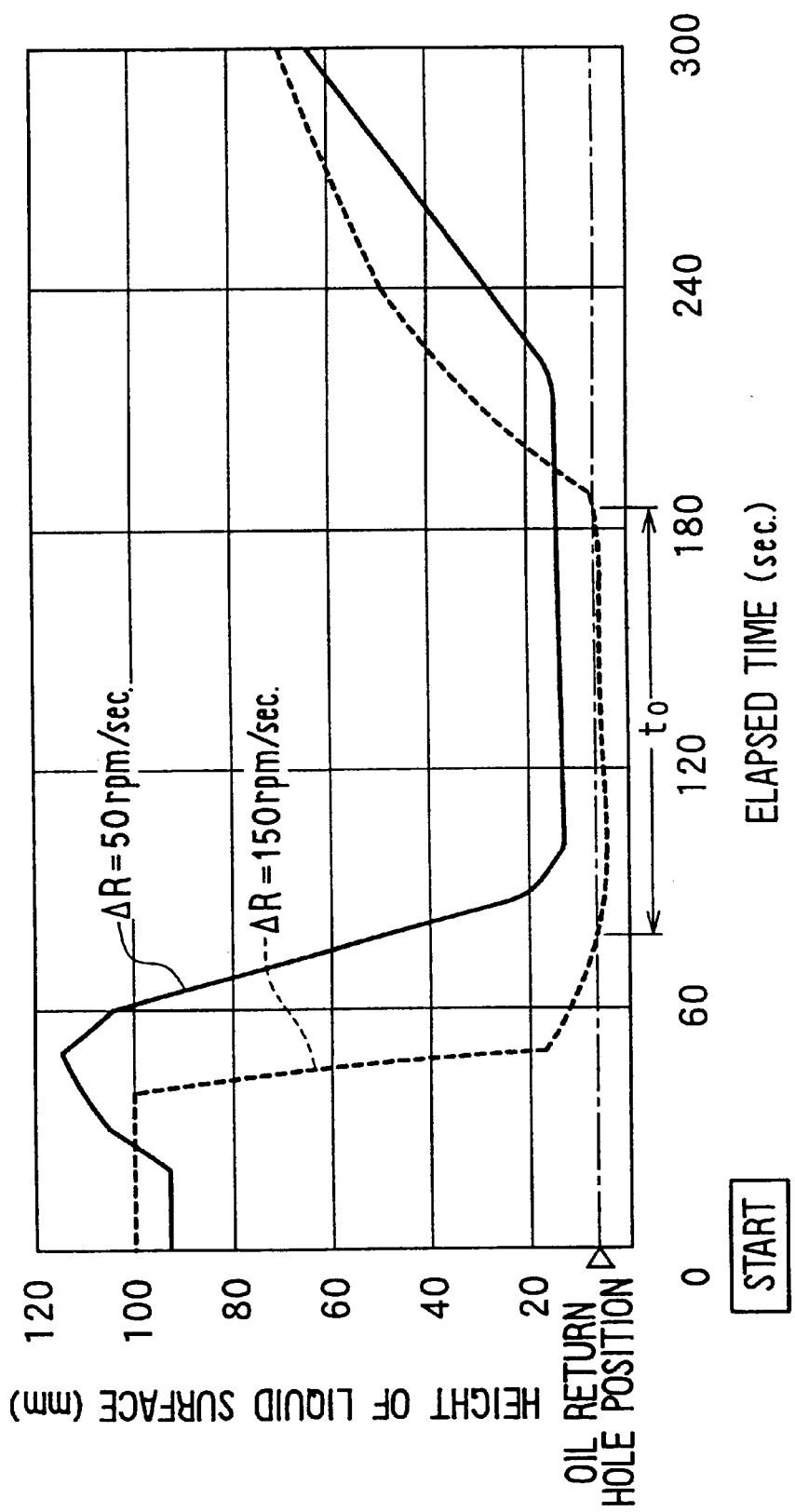
FIG. 6 is a graph showing a relationship between elapsed time since a start of the compressor and a height of a liquid refrigerant surface in a separator of the air conditioner according to the first embodiment.

Next, the effect of the first embodiment will be described with reference to results of an experiment shown in FIGS. 6 and 7. In FIG. 6, the vertical axis represents a height (mm) of the liquid refrigerant surface in the separator 24 and the horizontal axis represents elapsed time (sec.) since a start of the compressor 21. In the experiment, the refrigeration cycle 20 was left for one hour with the outside air temperature Tam being −10° C. and the inside air temperature being 30° C., and then was left for two hours with the outside air temperature Tam being −10° C. and the inside air temperature being −10° C. Thereafter, the compressor 21 was restarted with the outside air temperature Tam being −10° C. and the inside air temperature being −10° C.

As indicated by a dotted line in FIG. 6, when the deviation rate ΔR of the rotational speed of the compressor 21 is set to 150 rpm/sec. at the time of starting the compressor 21, the height of the liquid refrigerant surface in the separator 24 is greatly lowered toward the oil return hole 25b as the rotational speed of the compressor 21 increases quickly. During a period $t_0$ of approximately 90 seconds in FIG. 6, the height of the liquid refrigerant surface is kept lower than the oil return hole 25b. As a result, oil shortage of the compressor 21 occurs.

However, in the first embodiment, the deviation rate ΔR of the rotational speed of the compressor 21 at the time of starting the compressor 21 is restricted to 50 rpm/sec. when the outside air temperature Tam is low. As a result, as indicated by a solid line in FIG. 6, the height of the liquid refrigerant surface in the separator 24 is kept higher than the oil return hole 25b even when the liquid refrigerant surface in the separator 24 is lowered most. Therefore, oil shortage of the compressor 21 is restricted.

Oil shortage time of the compressor 21 is measured in the following manner. A sight glass which enables visual observation of a gas/liquid state of refrigerant is provided in a suction pipe of the compressor 21 at a position close to the outlet of the gas suction pipe 25 in FIG. 1. A period in which a refrigerant foaming state continues is measured as the oil shortage time by visual observation using the sight glass.

Figure 7:
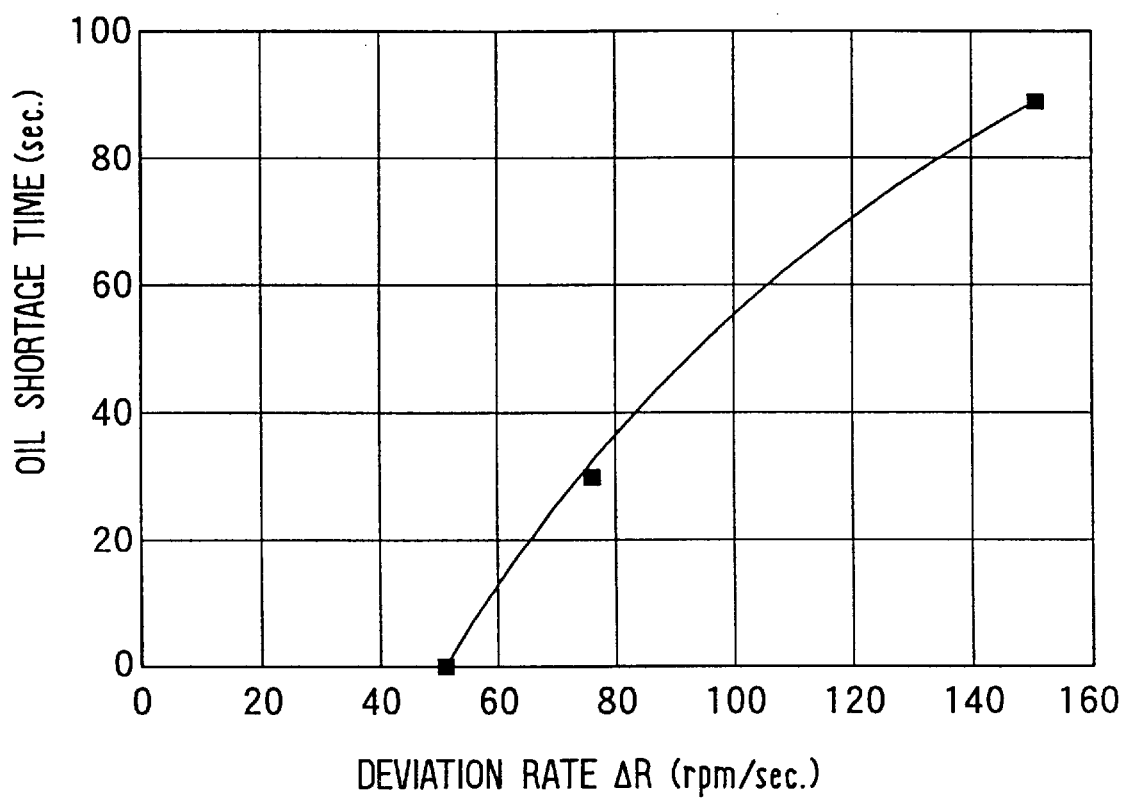
FIG. 7 is a graph showing a relationship between a deviation rate ΔR of the rotational speed of the compressor at the time of starting the compressor and an oil shortage time of the compressor according to the first embodiment.

Further, as shown in FIG. 7, when the deviation rate ΔR of the rotational speed of the compressor 21 at the time of starting the compressor 21 is set lower than or equal to 50 rpm/sec., the oil shortage time of the compressor 21 is zero, that is, oil shortage of the compressor 21 does not occur. When the deviation rate ΔR is set higher than 50 rpm/sec., the oil shortage of the compressor 21 occurs and the oil shortage time increases as the deviation rate ΔR increases. When the deviation rate ΔR is 150 rpm/sec., the oil shortage time becomes 90 seconds, in which case the oil shortage adversely affects the durability of the compressor 21.

If preventing the oil shortage of the compressor 21 is the only purpose, it is preferable that the deviation rate ΔR is set as low as possible. However, when the deviation rate ΔR is decreased, increase in the rotational speed of the compressor 21 is delayed. This causes delay of increase in the cycle high pressure Pd, which in turn causes delay of increase in a heating ability of the air conditioner. Therefore, it is preferable to set the deviation rate ΔR as high as possible within a range in which the oil shortage of the compressor 21 is restricted.

In the first embodiment, at step S130 in FIG. 5, when the outside air temperature Tam is low, the maximum deviation rate ΔRmax is fixed at the first predetermined value such as 50 rpm/sec. However, the first predetermined value may be decreased as the outside air temperature Tam decreases. This is advantageous in satisfying both requirements of preventing the delay of increase in the heating ability of the air conditioner and preventing the oil shortage of the compressor 21. The control of the maximum deviation rate ΔRmax at step S130 in FIG. 5 may be performed only for predetermined time after starting the heating mode.

Figure 8:
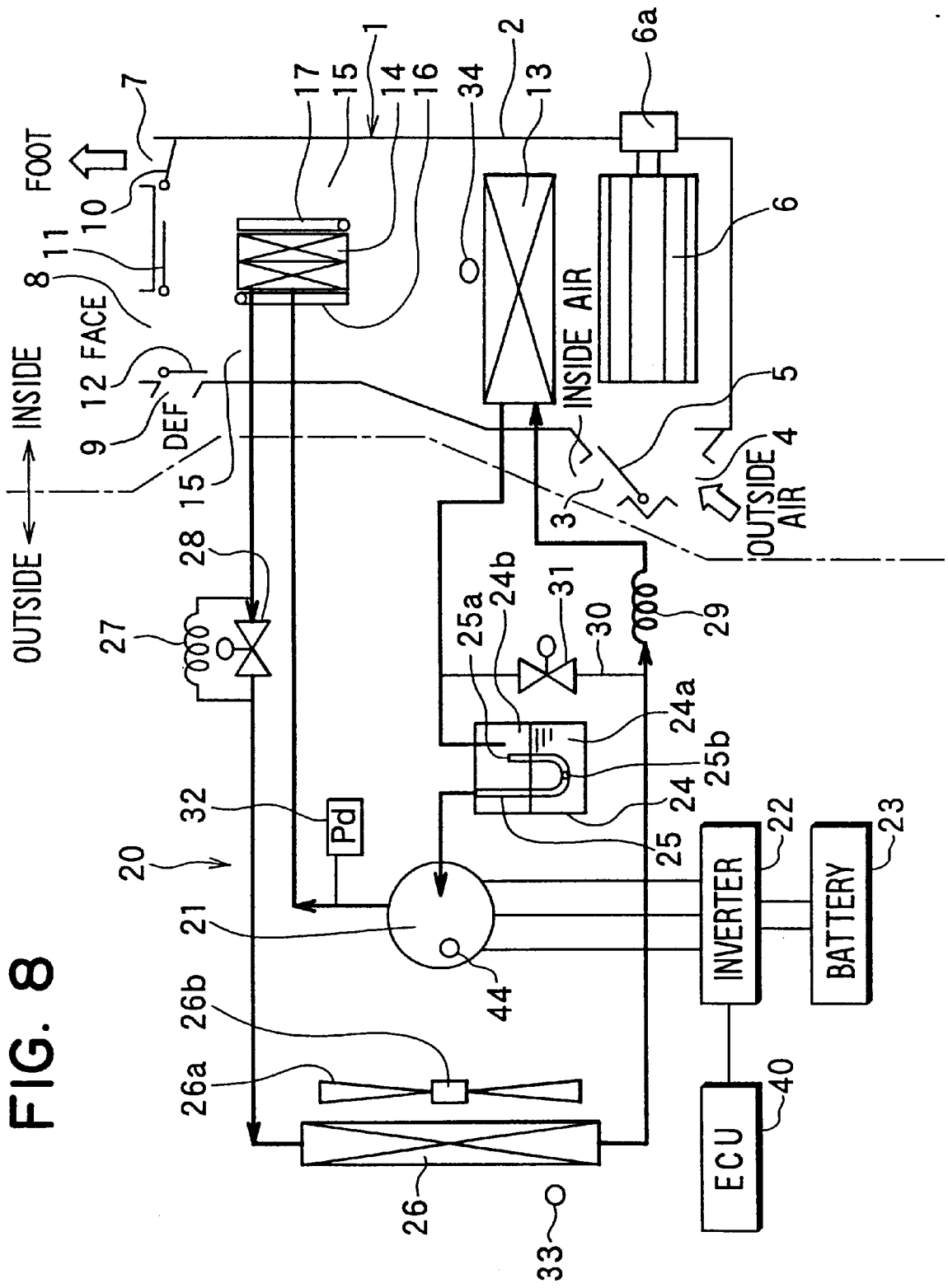
FIG. 8 is a schematic diagram showing the heat pump air conditioner in the cooling mode according to the first embodiment.

As shown in FIG. 8, when the air conditioner is operated in the cooling mode, the electromagnetic valve 28 is opened and the electromagnetic valve 31 is closed by the ECU 40. The switching doors 16 and 17 are manipulated so as to be located at positions indicated by solid lines in FIG. 8, whereby the air passage of the heating condenser 14 is closed and the bypass passages 15 are opened. As a result, refrigerant flows along a route indicated by thick solid lines in FIG. 8 in the refrigeration cycle 20, and the heating condenser 14 functions merely as are refrigerant passage. Therefore, high-pressure gas refrigerant discharged from the compressor 21 flows into the outside heat exchanger 26 via the heating condenser 14 and the electromagnetic valve 28, and hence the outside heat exchanger 26 functions as a condenser.

Liquid refrigerant condensed by the outside heat exchanger 26 is reduced in pressure by the capillary tube 29, and then evaporated by the evaporator 13 while absorbing heat from air flowing in the duct 2. Cool air that has been cooled through heat removal in the evaporator 13 is blown into the passenger compartment through the face air outlet 8 and cools the passenger compartment.

Figure 9:
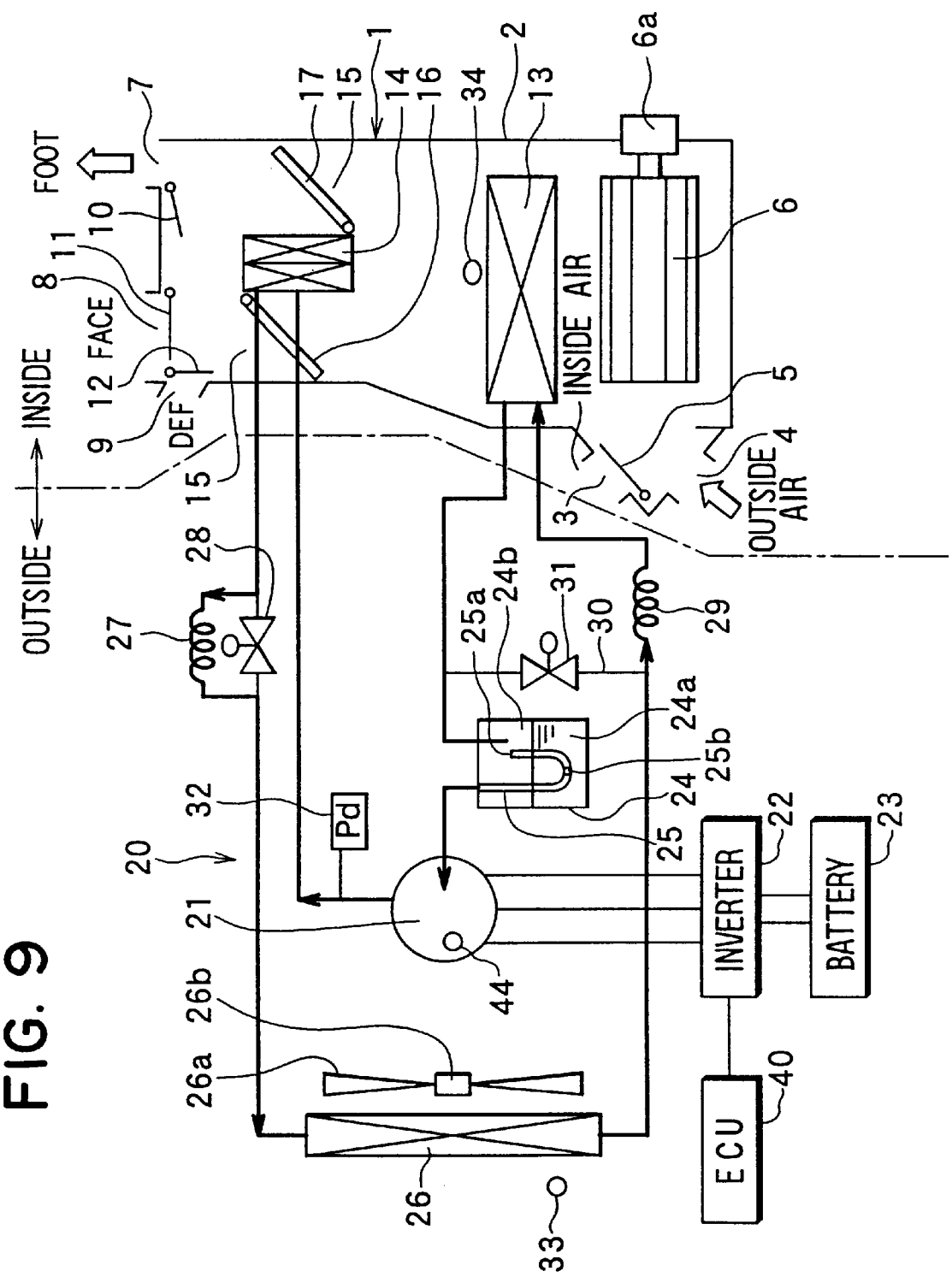
FIG. 9 is a schematic diagram showing the heat pump air conditioner in the dehumidification mode according to the first embodiment.

As shown in FIG. 9, when the air conditioner is operated in the dehumidifying mode, both electromagnetic valves 28 and 31 are closed by the ECU 40. The switching doors 16 and 17 are manipulated so as to be located at positions indicated by solid lines in FIG. 9, whereby the air passage of the heating condenser 14 is opened and the bypass passages 15 are closed. As a result, refrigerant flows along a route indicated by thick solid lines in FIG. 9 in the refrigeration cycle 20. Liquid refrigerant that has been condensed by the heating condenser 14 is reduced in pressure by the capillary tube 27, and then a predetermined amount of the liquid refrigerant is evaporated through heat absorption from the outside air in the outside heat exchanger 26. Then, the refrigerant is again reduced in pressure by the capillary tube 29 and a resulting low-pressure refrigerant is evaporated by the evaporator 13 while absorbing heat from the blown air in the duct 2.

In the dehumidification mode, refrigerant flows into both the evaporator 13 and the condenser 14. Air blown by the blower 6 is first cooled and dehumidified by the evaporator 13 and then heated by the condenser 14. A quantity of heat released from the condenser 14 is equal to a sum of a quantity of heat absorbed by the outside heat exchanger 26 and the evaporator 13 and a quantity of heat corresponding to a compression work of the compressor 21. Therefore, a temperature of air discharged from the condenser 14 can be made higher than a temperature of air introduced from the inlet 3 or 4, and heating of air and dehumidification of air can be performed simultaneously.

Second Embodiment

A second preferred embodiment of the present invention will be described with reference to FIGS. 10A and 10B. In this and following embodiments, components which are substantially the same as those in pervious embodiments are assigned the same reference numerals.

Figure 10A:
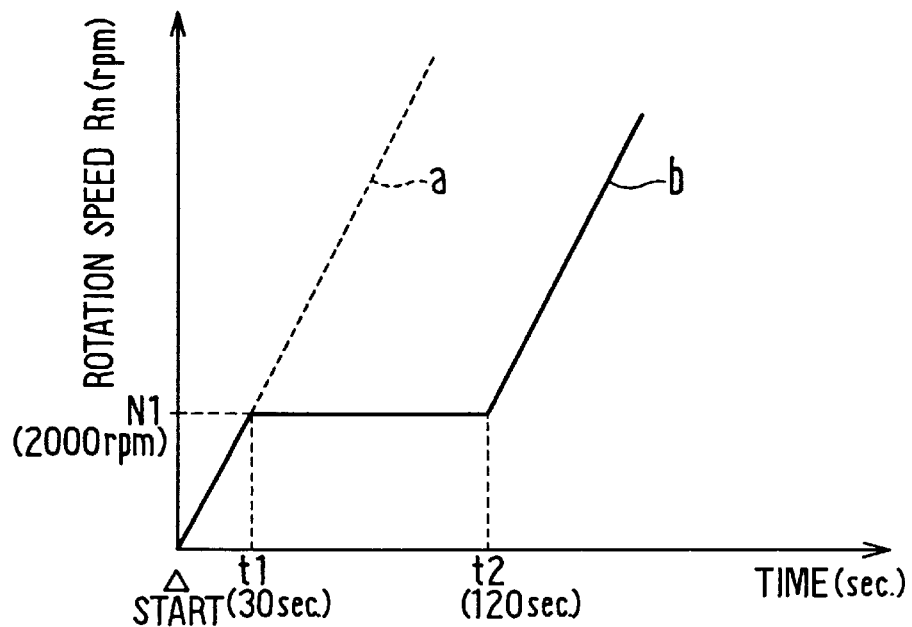
FIG. 10A is a control characteristics diagram of the rotational speed of a compressor of a heat pump air conditioner according to a second preferred embodiment of the invention.

A broken line "a" in FIG. 10A represents a control characteristics of the rotational speed $P_n$ of the compressor 21 when the outside air temperature Tam is higher than or equal to a predetermined temperature such as 0° C. (hereinafter referred to as normal state). The rotational speed $R_n$ of the compressor 21 is calculated according to the above-mentioned equation (3) in the first embodiment. Since the value calculated at step S110 in FIG. 5 is used as the deviation rate ΔR, it is not necessary to execute steps S120–160 in FIG. 5.

A solid line "b" in FIG. 10A represents a control characteristics of the rotational speed $R_n$ of the compressor 21 when the outside air temperature Tam is lower than the ad predetermined temperature such as 0° C. (hereinafter referred to as low outside temperature state). Until a predetermined time t1 (e.g., 30 sec.) elapses since a start of the compressor 21, the rotational speed $R_n$ of the compressor 21 is increased according to the control characteristics of the normal state indicated by the broken line "a" in FIG. 10A. After the predetermined time t1 has elapsed, the rotational speed $R_n$ of the compressor 21 is restricted from increasing, and is forcibly kept at a predetermined intermediate rotational speed N1 (e.g., 2,000 rpm). The intermediate rotational speed N1 is set sufficiently lower than a rotational speed of the compressor 21 when increase of the rotational speed of the compressor 21 is completed (e.g., 9,000 rpm). The rotational speed $R_n$ is kept at the intermediate rotational speed N1 for a predetermined period (e.g., 90 sec.) until a predetermined time t2 (e.g., 120 sec.) elapses since the start of the compressor 21. Thereafter, the rotational speed $R_n$ of the compressor 21 is increased according to the equation (3) in the first embodiment.

Figure 10B:
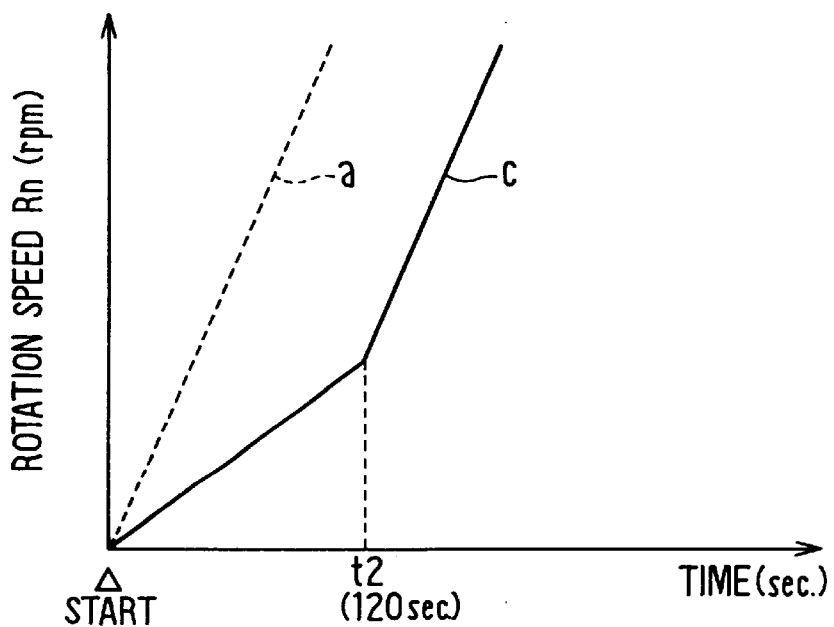
FIG. 10B is another control characteristics diagram of the rotational speed of the compressor according to the second embodiment.

The control of FIG. 10A may be modified as shown in FIG. 10B. In FIG. 10B, the deviation rate ΔR of the rotational speed of the compressor 21 in the low outside temperature state indicated by a solid line "c" in FIG. 10B is set sufficiently smaller than that in the normal state indicated by a broken line "a" in FIG. 10B, until a predetermined time t2 (e.g., 120 sec.) has elapsed since a start of the compressor 21. After the predetermined time t2 has elapsed, the deviation rate ΔR in the low outside temperature state is increased to be equal or substantially equal to that in the normal state.

According to the second embodiment, in the control of FIG. 10A, while the rotational speed of the compressor 21 is increased after a start of the compressor 21, the rotational speed $R_n$ of the compressor 21 is forcibly kept at the predetermined intermediate rotational speed N1 such as 2,000 rpm. As a result, a rapid drop of the suction pressure of the compressor 21 is restricted. Further, in the control of FIG. 10B, in the low outside temperature state, the deviation rate ΔR is set to a first value sufficiently smaller than that in the normal state until the predetermined time t2 has elapsed since the start of the compressor 21, and then is set to a second value equal to that in the normal state. As a result, a rapid drop of the suction pressure of the compressor 21 is restricted at the time of starting the compressor 21.

Therefore, in each of the controls of FIGS. 10A and 10B, evaporation or foaming of liquid refrigerant in the separator 24 is restricted, and a lowering speed of the liquid refrigerant surface in the separator 24 is decreased at the time of starting the compressor 21. As a result, the liquid refrigerant surface in the separator 24 is kept higher than the oil return hole 25b, whereby oil shortage of the compressor 21 is restricted and proper lubrication of the compressor 21 is secured.

Third Embodiment

A third preferred embodiment of the present invention will be described with reference to FIGS. 11A–12. In the third embodiment, when the outside air temperature Tam is low in the heating mode, an opening/closing control of the electromagnetic valve 28 of the capillary tube 27 is performed. When the outside air temperature Tam is normal in the heating mode, the electromagnetic valve 28 is kept closed after a start of the compressor 21.

Figure 11A:
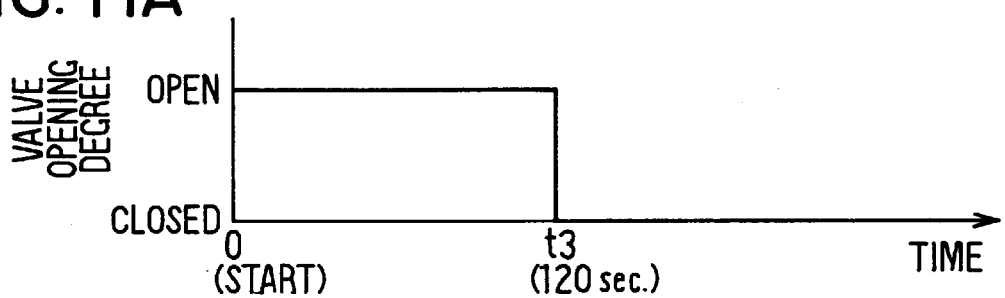
FIG. 11A is a control characteristics diagram of an electromagnetic valve of a heat pump air conditioner according to a third preferred embodiment of the invention.
Figure 11B:
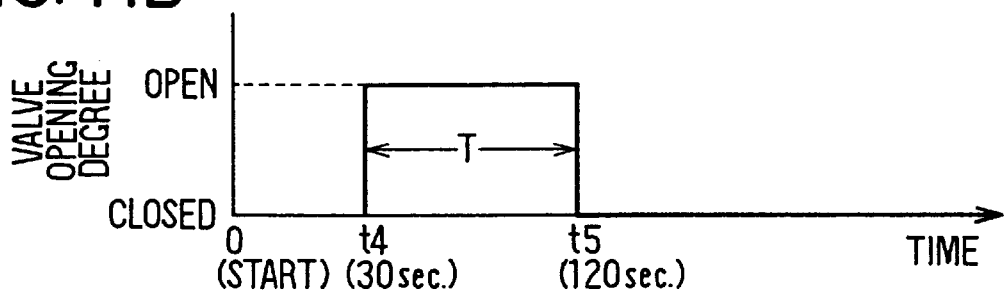
FIG. 11B is another control characteristics diagram of the electromagnetic valve according to the third embodiment.

In FIG. 11A, the electromagnetic valve 28 is forcibly kept open until a predetermined time t3 (e.g., 120 sec.) has elapsed after a start of the compressor 21 and then is closed. In FIG. 11B, the electromagnetic valve 28 is closed until a predetermined time t4 (e.g., 30 sec.) has elapsed after a start of the compressor 21, and then is forcibly opened for a predetermined valve opening time T (e.g., 90 sec.) until a predetermined time t5 (e.g., 120 sec.) has elapsed since a start of the compressor 21. After the predetermined time t5 has elapsed, the electromagnetic valve 28 is again closed.

One of the reason why the suction pressure of the compressor 21 is rapidly decreased at the time of starting the heating mode is that a flow rate of refrigerant in the refrigeration cycle 20 becomes insufficient due to a small diameter of the capillary tube 27 at the time of starting the compressor 21. According to the third embodiment, the electromagnetic valve 28 is controlled to be opened for a predetermined time at the time of starting the heating mode so that refrigerant with a small pressure loss flows through the valve 28 bypassing the capillary tube 27. As a result, the flow rate of refrigerant in the refrigeration cycle 20 is greatly increased at the time of starting the compressor 21, and hence a rapid drop of the suction pressure of the compressor 21 is restricted.

Figure 12:
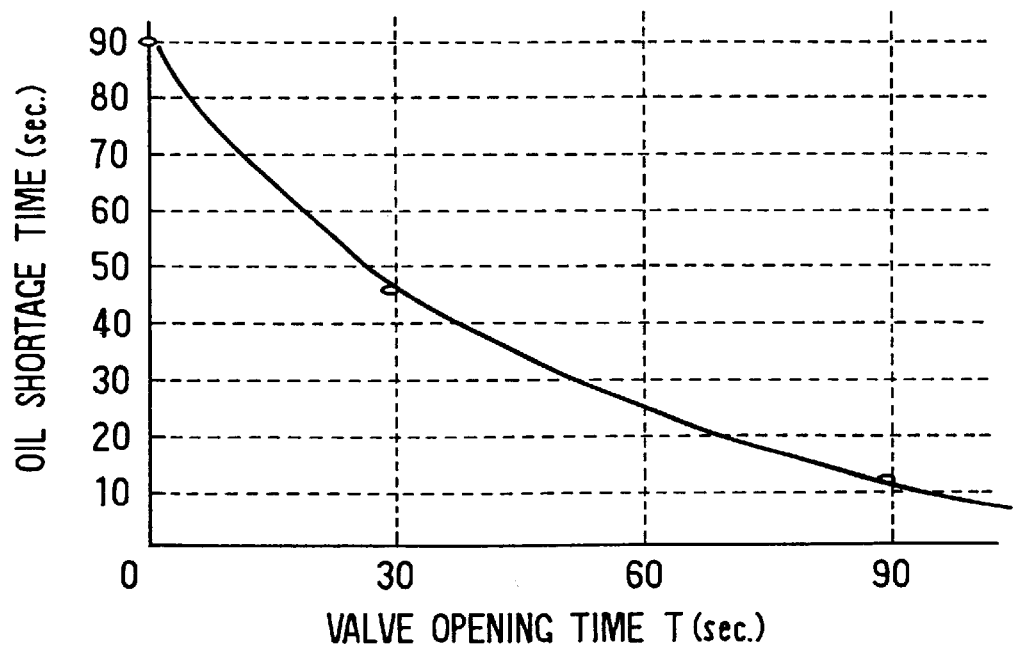
FIG. 12 is a graph showing a relationship between opening time of the electromagnetic valve and oil shortage time of a compressor of the air conditioner according to the third embodiment.

As shown in FIG. 12, the oil shortage time of the compressor 21 can be reduced by increasing a valve opening time T of the electromagnetic valve 28 in FIG. 11B. In FIG. 12, the air conditioner was left for three hours with the outside air temperature Tam being −10° C. and the inside air temperature being 30° C. after operation in the heating mode. The sealed amount of refrigeration in the refrigeration cycle 20 was 750 g, and the deviation rate ΔR of the rotational speed of the compressor 21 at the time of starting the compressor 21 was 150 rpm/sec.

Fourth Embodiment

A fourth preferred embodiment of the present invention will be described with reference to FIGS. 13–14B. In the fourth embodiment, electric expansion valves 270 and 290 with a variable opening degree are used as decompressing units for heating and cooling, respectively.

Figure 13:
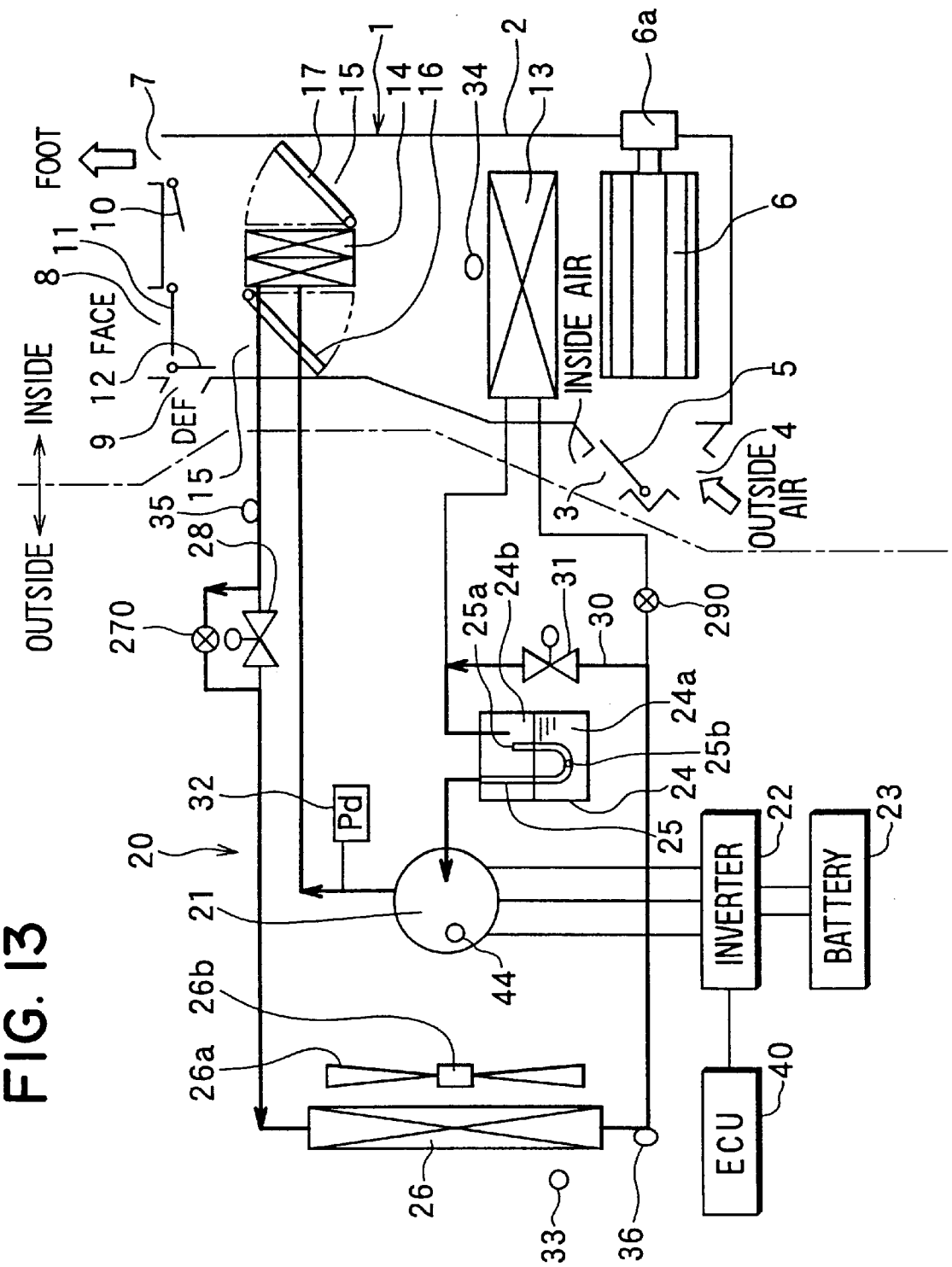
FIG. 13 is a schematic diagram showing a heat pump air conditioner in a heating mode according to a fourth preferred embodiment of the invention.

As shown in FIG. 13, to control the electric expansion valves 270 and 290, refrigerant temperature sensors 35 and 36 are additionally attached to refrigerant pipes connected to the outlet of the heating condenser 14 and the outlet of the outside heat exchanger 26, respectively. In the heating mode, an opening degree of the expansion valve 270 is controlled based on detection signals from the high pressure sensor 32 and the refrigerant temperature sensor 35, so that a degree of supercooling of refrigerant at the outlet of the heating condenser 14 becomes a target value. In the cooling mode, an opening degree of the expansion valve 290 is controlled based on detection signals from the high pressure sensor 32 and the refrigerant temperature sensor 36, so that a degree of supercooling of refrigerant at the outlet of the outside heat exchanger 26, which is used as the condenser, becomes a target value.

In FIG. 14A, reference character A denotes a range of a valve opening degree of the expansion valve 270 in a state that a start of a heating mode operation has completed and a transition has been made to a steady operation. Reference character B denotes a valve opening degree of the expansion valve 270 when the heating mode is started in the normal state in which the outside air temperature Tam is higher than or equal to 0° C. Reference character C denotes a valve opening degree of the expansion valve 270 when the heating mode is started in the low outside temperature state in which the outside air temperature Tam is lower than 0° C. The expansion valve 270 is substantially fully opened at the valve opening degree C.

According to the fourth embodiment, as shown in FIG. 14B, the opening degree of the expansion valve 270 is increased to the opening degree B or C for a predetermined time t6 (e.g., 120 sec.) after a start of the heating mode. Particularly in the low outside temperature state, the opening degree of the expansion valve 270 is increased to the opening degree C so that the expansion valve 270 is substantially fully opened. As a result, similarly to the third embodiment, the flow rate of refrigerant in the refrigeration cycle 20 can be largely increased at the time of starting the heating mode, and hence a rapid drop of the suction pressure of the compressor 21 is restricted. Therefore, oil shortage of the compressor 21 is restricted.

Fifth Embodiment

Figure 15:
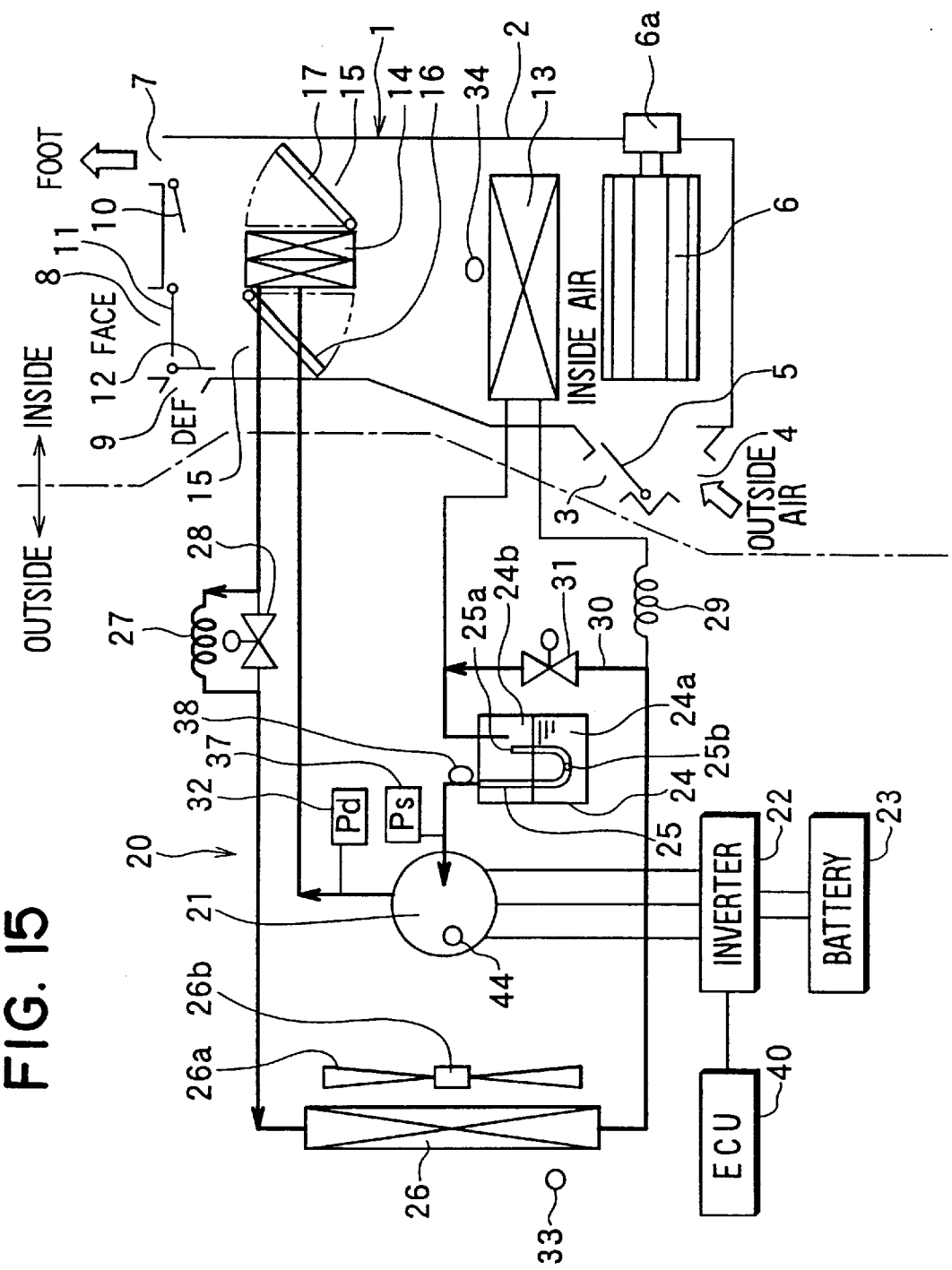
FIG. 15 is a schematic diagram showing a heat pump air conditioner in a heating mode according to a fifth preferred embodiment of the invention.
Figure 16:
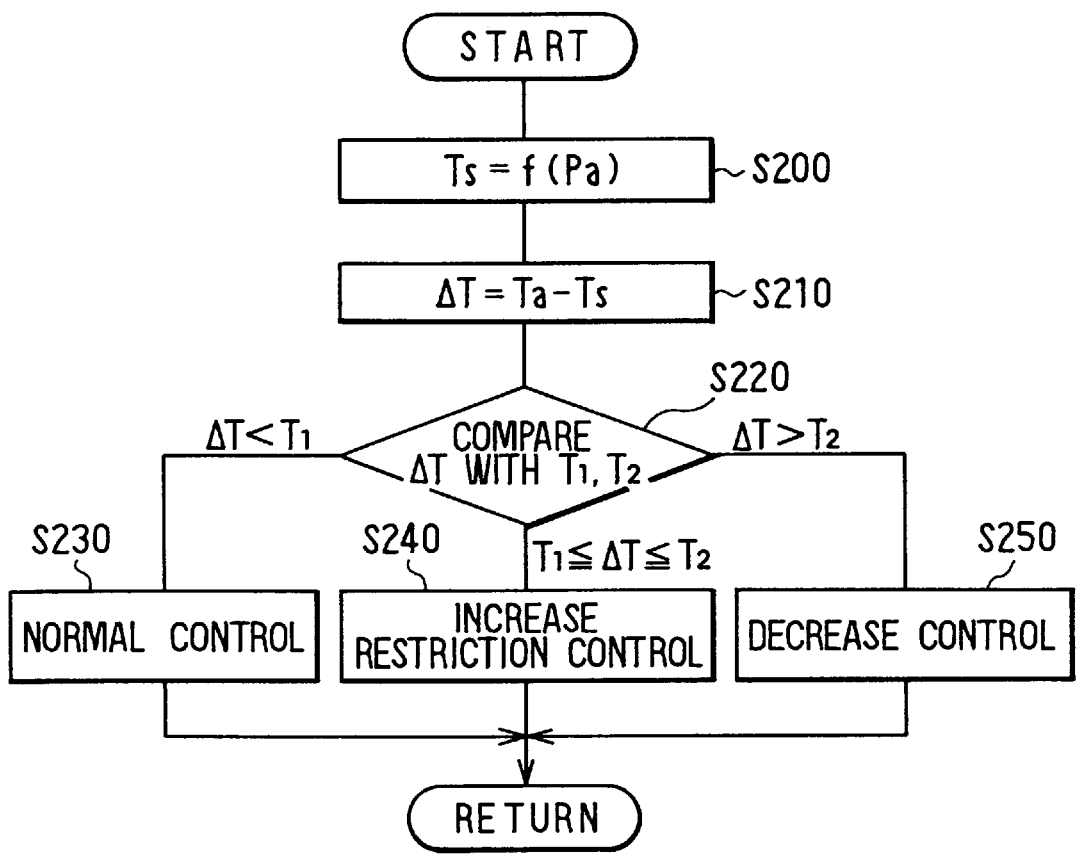
FIG. 16 is a flow diagram showing a control routine of rotational speed of a compressor of the air conditioner according to the fifth embodiment.

A fifth embodiment of the present invention will be described with reference to FIGS. 15 and 16. In the fifth embodiment, as shown in FIG. 15, a low pressure sensor 37 for detecting a low pressure of refrigerant in the refrigeration cycle 20 (hereinafter referred to as cycle low pressure) and a low-pressure refrigerant temperature sensor 38 are additionally provided on the outlet side of the separator 24 (i.e., the suction side of the compressor 21). A state of refrigerant at the outlet side of the separator 24 is judged based on detection signals from the sensors 37 and 38. The rotational speed of the compressor 21 is controlled based on the judged refrigerant state.

A control routine of the rotational speed of the compressor 21 according to the fifth embodiment will be described with reference to FIG. 16. As shown in FIG. 16, the control routine is started upon setting of the heating mode. First, at step S200, a saturation temperature Ts of refrigerant at the outlet of the separator 24 is calculated based on a at pressure Pa detected by the low pressure sensor 37. Since the saturation temperature Ts is determined based on the pressure Pa, the saturation temperature Ts can be calculated by an equation Ts=f(Pa).

Then, the process goes to step S210, where a temperature difference $\Delta T$ between an actual temperature Ta of refrigerant at the outlet of the separator 24 detected by the low-pressure refrigerant temperature sensor 38 and the above-calculated saturation temperature Ts is obtained. The temperature difference $\Delta T$ represents a supercooling degree of the refrigerant at the outlet of the separator 24. At step S220, the temperature difference $\Delta T$ is compared with first and second preset values $T_1$ and $T_2$. The first preset value $T_1$ is 2° C. and the second preset value $T_2$ is 6° C., for example.

If $\Delta T < T_1$, it is judged that refrigerant at the outlet of the separator 24 is close to saturated liquid refrigerant. Therefore, the process goes to step S230, where a normal control on the rotational speed of the compressor 21 is performed. This normal control is the same as the control in the normal state represented by the broken line "a" in FIG. 10A in the second embodiment. If it is judged at step S220 that $T_1 \leq \Delta T \leq T_2$, the process goes to step S240, where an increase restriction control for restricting an increase of the rotational speed of the compressor 21 is performed. If it is judged at step S220 that $\Delta T > T_2$, the process goes to step S250, where a decrease control for decreasing the rotational speed of the compressor 21 is performed.

The temperature difference $\Delta T$ between the actual temperature Ta and the saturation temperature Ts correlates with an amount of liquid refrigerant in the separator 24. Therefore, by controlling the rotational speed of the compressor 21 in accordance with the temperature difference $\Delta T$ at steps S230–S250, a rapid drop of the suction pressure of the compressor 21 is restricted, thereby restricting oil shortage of the compressor 21.

Sixth Embodiment

Figure 17:
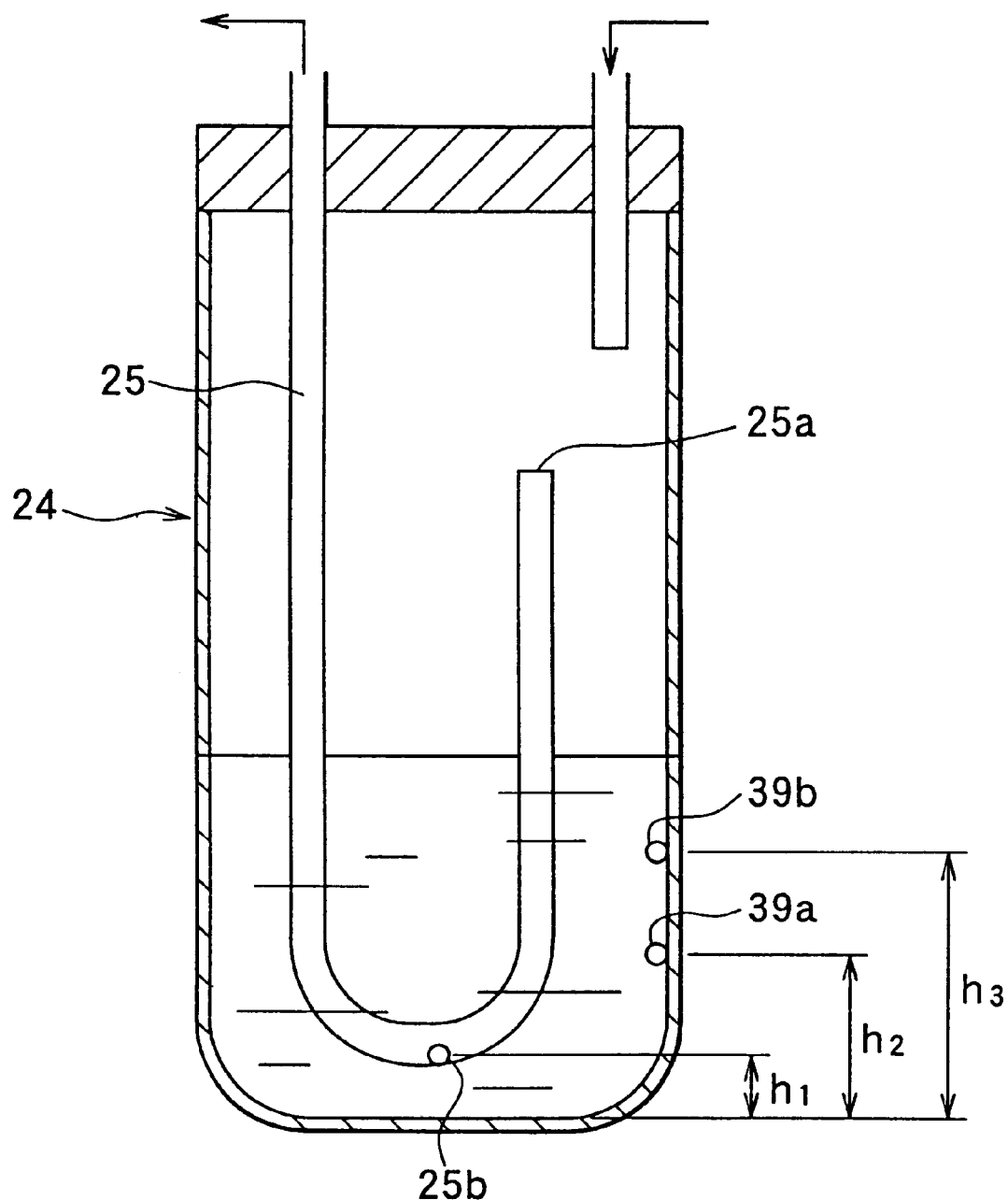
FIG. 17 is a sectional view showing a separator of a heat pump air conditioner according to a sixth preferred embodiment of the present invention.

A sixth preferred embodiment of the present invention will be described with reference to FIGS. 17 and 18. In the sixth embodiment, as shown in FIG. 17, first and second liquid refrigerant surface sensors 39a and 39b are provided in the separator 24. A height of the oil return hole 25b from a bottom of the separator 24 is h1. The first surface sensor 39a is disposed at a height h2 that is larger than the height h1 by a predetermined value $\alpha$. The second surface sensor 39b is disposed at a height h3 that is larger than the height h2 by a predetermined value $\beta$. In the sixth embodiment, the height h2 is set to h1 plus 10 mm, and the height h3 is set to h1 plus 30 mm. The height h3 is set sufficiently smaller than a height of the end opening 25a of the gas suction pipe 25.

The rotational speed of the compressor 21 is controlled as shown in FIG. 18 based on liquid surface signals sent from the first and second surface sensors 39a and 39b. That is, a control of the rotational speed of the compressor 21 is switched to the normal control, the increase restriction control and the decrease control in this order, as a height of the liquid refrigerant surface in the separator 24 is decreased. According to the sixth embodiment, a rapid drop of the suction pressure of the compressor 21 is restricted, and oil shortage of the compressor 21 is restricted.

The rotational speed of the compressor 21 may be controlled according to a lowering speed of the liquid refrigerant surface, instead of a height of the liquid refrigerant surface. The lowering speed of the liquid refrigerant surface in the separator 24 is calculated from a distance between the sensors 39a, 39b in a vertical direction and time elapsed while the liquid refrigerant surface is lowered from the sensor 39b to the sensor 39a. The rotational speed of the compressor 21 is controlled by the normal control, the increase restriction control and the decrease control in this order as the lowering speed of the liquid refrigerant surface is increased.

Seventh Embodiment

A seventh preferred embodiment of the present invention will be described with reference to FIG. 19. In the seventh embodiment, a temperature Tho of refrigerant at the outlet of the outside heat exchanger 26 is detected by the refrigerant temperature sensor 36 in FIG. 13. A temperature difference $\Delta T$ between the temperature Tho and the outside air temperature Tam is calculated by the ECU 40. Further, a correction coefficient C1 is calculated by the ECU 40 based on the temperature difference $\Delta T$. As shown in FIG. 19, the correction coefficient C1 is set to 1 when the temperature difference $\Delta T$ is 0, and is gradually decreased as the temperature difference $\Delta T$ increases.

A corrected rotational speed $R_n{'}$ of the compressor 21 is calculated by multiplying the rotational speed $R_n$ of the compressor 21 calculated by the method shown in FIG. 5 by the correction coefficient C1. That is, the corrected rotational speed $R_n{'}$ is calculated by an equation $R_n{'}=C1\cdot R_n$.

As the suction pressure of the compressor 21 decreases, the temperature Tho decreases, therefore the temperature difference ΔT increases. According to the seventh embodiment, as the temperature difference ΔT increases, the correction coefficient C1 is decreased to restrict an upper limit of the rotational speed of the compressor 21. As a result, oil shortage of the compressor 21 is restricted.

Eighth Embodiment

An eighth preferred embodiment of the present invention will be described with reference to FIG. 20. When the cooling mode in FIG. 9 is set, and it is judged that the outside heat exchanger 26 is frosted in the heating mode in winter, the outside heat exchanger 26 is switched to a condenser and a defrosting mode is set so that the outside heat exchanger 26 is defrosted. In the air conditioner of the electric vehicle, if the defrosting mode is set while the vehicle is running, a heating feeling of the passenger in the passenger compartment may deteriorate. Therefore, it is preferable to set the defrosting mode while a battery of the electric vehicle is charged.

In the defrosting mode, when the suction pressure of the compressor 21 is decreased, oil may be insufficiently returned to the compressor 21, causing oil shortage of the compressor 21. If the rotational speed of the compressor 21 is decreased in the defrosting mode, decrease in the suction pressure of the compressor 21 is restricted and a sufficient amount of oil is returned to the compressor 21 although the defrosting time becomes longer. Since vehicle battery charging time is relatively long, when the defrosting mode is set during battery charging, deterioration of the heating feeling of the passenger can be avoided even if defrosting time is elongated.

In the eighth embodiment, as shown in FIG. 20, the rotational speed of the compressor 21 is controlled in a similar manner as in FIG. 19. When the height of the liquid refrigerant surface is lowered from h3 to h1, a correction coefficient C2 is gradually decreased from 0.7 to 0.5. A corrected rotational speed $R_n{'}$ of the compressor 21 is calculated by multiplying the rotational speed $R_n$ calculated by the method shown in FIG. 5 by the correction coefficient C2. That is, the corrected rotational speed $R_n{'}$ is calculated by an equation $R_n{'}=C2\cdot R_n$.

According to the eighth embodiment, an upper limit of the rotational speed of the compressor 21 is restricted in accordance with a height of the liquid refrigerant surface in the separator 24. As a result, oil is sufficiently returned to the compressor 21 and hence oil shortage of the compressor 21 is restricted.

Ninth Embodiment

Figure 21:
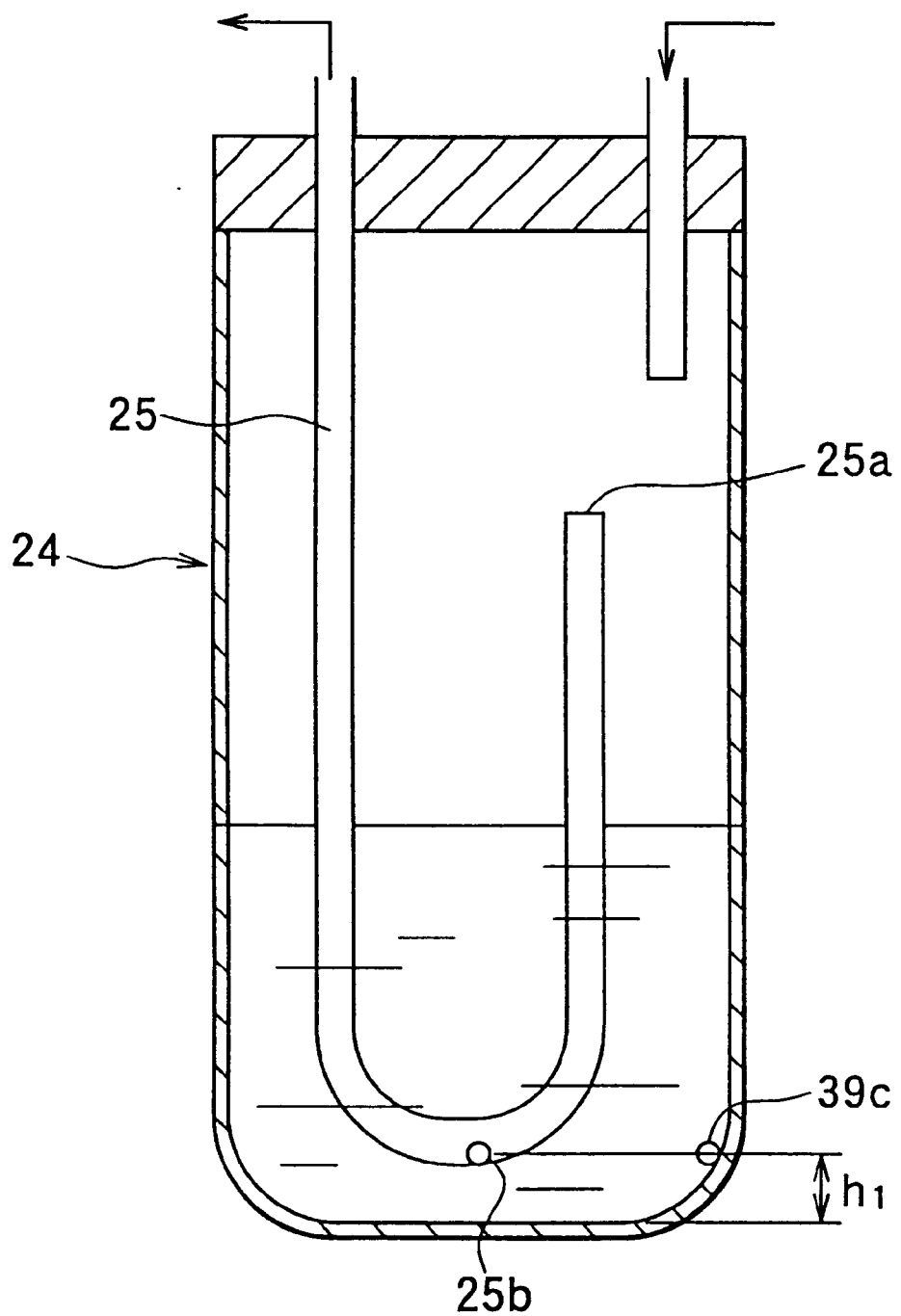
FIG. 21 is a sectional view showing a separator of a heat pump air conditioner according to a ninth preferred embodiment of the present invention.

A ninth preferred embodiment of the present invention will be described with reference to FIG. 21. In the ninth embodiment, as shown in FIG. 21, a single liquid refrigerant surface sensor 39c is provided at a height h1 which is substantially equal to that of the oil return hole 25b, instead of the sensors 39a, 39b in FIG. 17. When a height of the liquid refrigerant surface in the separator 24 is larger than the height h1, a control of the rotational speed of the compressor 21 is set to the normal control. When a height of the liquid refrigerant surface in the separator 24 becomes smaller than the height h1, the control of the rotational speed of the compressor 21 is set to the decrease control. As a result, oil shortage of the compressor 21 is restricted.

Tenth Embodiment

Figure 22:
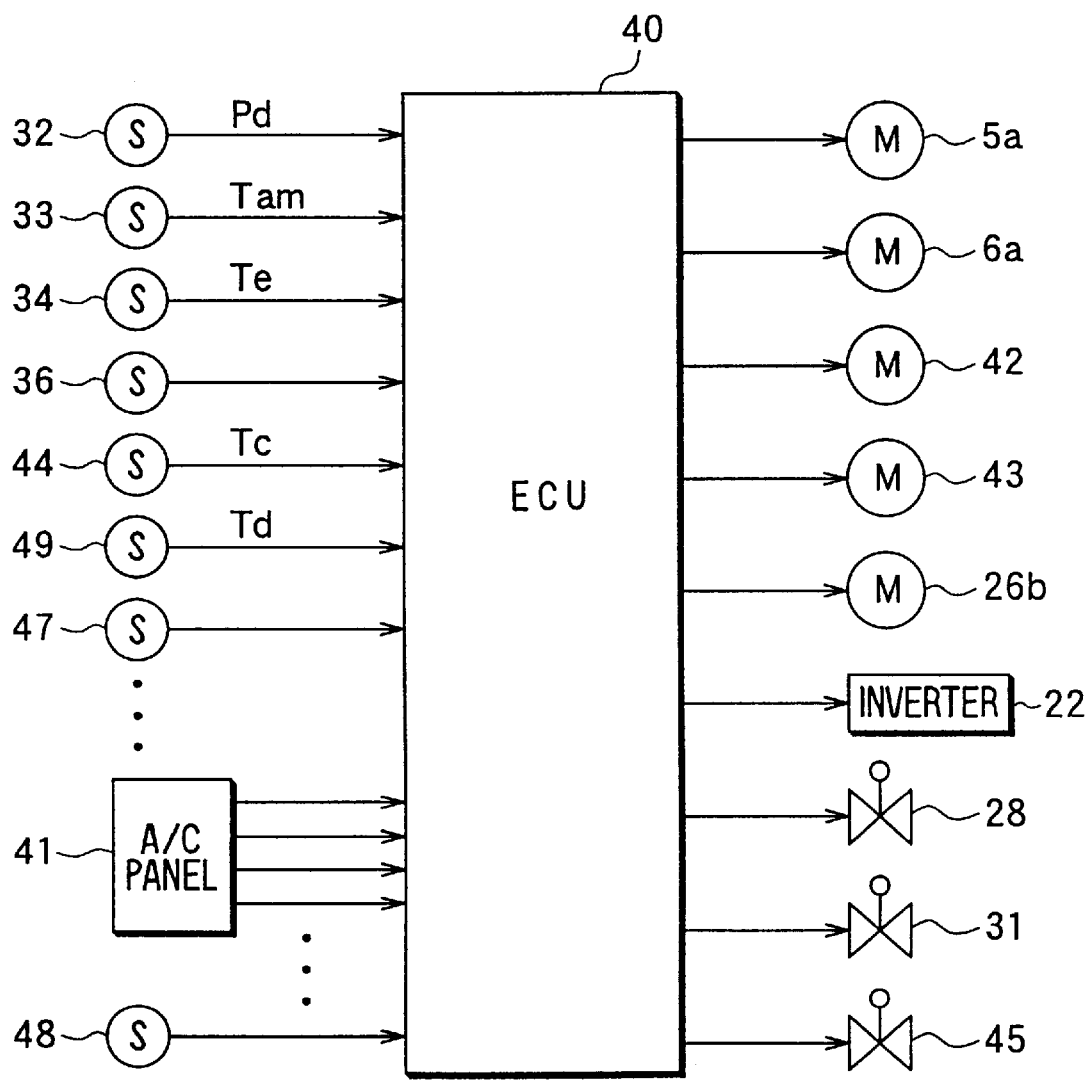
FIG. 22 is a block diagram showing a control system of a heat pump air conditioner according to a tenth preferred embodiment of the present invention.

A tenth preferred embodiment of the present invention will be described with reference to FIGS. 22 and 23. In the above-mentioned first through ninth embodiments, the rotational speed of the compressor 21 is controlled so that oil shortage of the compressor 21 is restricted in the heating mode. However, oil shortage of the compressor 21 also occurs in the cooling mode. Further, also in the dehumidification mode in FIG. 10, when the evaporator 13 is left at a low temperature after the operation in the dehumidification mode, refrigerant may stay inside the evaporator 13 similarly to the cooling mode. Therefore, when the air conditioner is restarted, a flow rate of refrigerant in the refrigeration cycle 20 may become too small in comparison with a discharge amount of refrigerant from the compressor 21, thereby causing oil shortage of the compressor 21.

In the tenth embodiment, oil shortage of the compressor 21 is restricted in the cooling mode and the dehumidification mode. As shown in FIG. 23, a bypass electromagnetic valve 45 is connected to the capillary tube 29 in parallel so that refrigerant flows through the valve 45 bypassing the capillary tube 29. When it is judged that a condition for rapidly lowering the liquid refrigerant surface in the separator 24 toward the oil return hole 25b is satisfied at the time of starting the cooling mode or the dehumidification mode, the electromagnetic valve 45 is forcibly opened for a predetermined time similarly to the third embodiment. As a result, oil shortage of the compressor 21 is restricted. Whether the condition for rapidly lowering the liquid refrigerant surface is satisfied or not may be judged by a method according to the first through ninth embodiments or a different method described in the following embodiments.

Eleventh Embodiment

An eleventh preferred embodiment of the present invention will be described with reference to FIGS. 22–24. In the eleventh embodiment, as shown in FIG. 23, a liquid refrigerant sensor 47 is provided in a suction pipe 46 of the compressor 21 disposed between the gas suction pipe 25 and the inlet of the compressor 21 for detecting an amount of liquid a refrigerant returned to the compressor 21. The liquid refrigerant sensor 47 has a heater element such as a thermistor, which changes an electrical resistance thereof as an amount of heat radiation thereof changes.

When a ratio of liquid refrigerant in refrigerant flowing in the suction pipe 46 is increased, an amount of heat radiation of the thermistor is increased. As a result, a temperature of the thermistor is decreased, thereby increasing the electrical resistance of the thermistor. An amount of liquid refrigerant returned to the compressor 21 is detected according to a relationship between the ratio of the liquid refrigerant in the suction pipe 46 and change in the electrical resistance of the thermistor.

Figure 24:
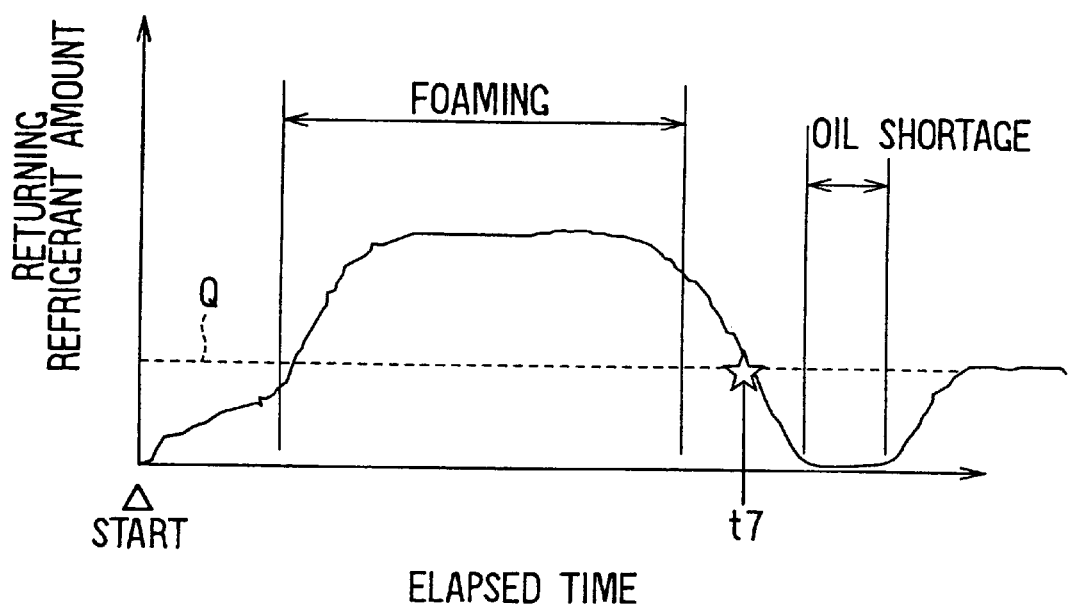
FIG. 24 is a graph showing a relationship between elapsed time since a start of a compressor and an amount of liquid refrigerant returning to a compressor of a heat pump air conditioner according to an eleventh preferred embodiment of the present invention.

As shown in FIG. 24, the amount of liquid refrigerant returning to the compressor 21 tentatively exceeds a predetermined value Q of a steady state due to foaming of liquid refrigerant in the separator 24, and then is rapidly decreased to cause oil shortage of the compressor 21.

In the eleventh embodiment, after foaming of liquid refrigerant occurs in the separator 24, whether the amount of liquid refrigerant returning to the compressor 21 is smaller than the predetermined value Q is judged based on the detection signals from the liquid refrigerant sensor 47. In FIG. 24, the amount of liquid refrigerant returning to the compressor 21 becomes smaller than the predetermined value Q after a predetermined time t7 has elapsed. Therefore, the rotational speed of the compressor 21 is controlled to be decreased after the predetermined time t7 has elapsed. As a result, oil shortage of the compressor 21 is restricted.

Twelfth Embodiment

A twelfth preferred embodiment of the present invention will be described with reference to FIGS. 22 and 23. In the twelfth embodiment, as shown in FIG. 23, a refrigerant temperature sensor 48 is provided in an outlet pipe of the evaporator 13. The twelfth embodiment is a modification of the fifth embodiment. A saturation temperature Ts of refrigerant at the outlet of the evaporator 13 is calculated based on the pressure Pa detected by the low pressure sensor 37. Further, a temperature difference ΔT between an actual temperature Ta of refrigerant at the outlet of the evaporator 13 detected by the temperature sensor 48 and the saturation temperature Ts is compared with T1 and T2 in FIG. 16. The temperature difference ΔT represents a supercooling degree of refrigerant at the outlet of the evaporator 13. The rotational speed of the compressor 21 is controlled by steps S230–s250 in FIG. 16.

While foaming of liquid refrigeration occurs in the separator 24 before the predetermined time t7 has elapsed in FIG. 24, refrigerant having stayed inside the evaporator 13 while the refrigeration cycle 20 was stopped is sucked into the compressor 21 through the separator 24. Therefore, after the predetermined time t7 has elapsed, refrigerant at the outlet of the evaporator 13 becomes to have a supercooling degree. In the twelfth embodiment, the supercooling degree of the refrigerant at the outlet of the evaporator 13 is detected, and the rotational speed of the compressor 21 is controlled according to the supercooling degree. As a result, oil shortage of the compressor 21 is restricted. In the heating mode, the rotational speed of the compressor 21 may be controlled based on a temperature difference ΔT between the temperature Ta of refrigerant discharged from the outside heat exchanger 26 detected by the temperature sensor 36 and the saturation temperature Ts at the outlet of the outside heat exchanger 26.

Thirteenth Embodiment

Figure 25:
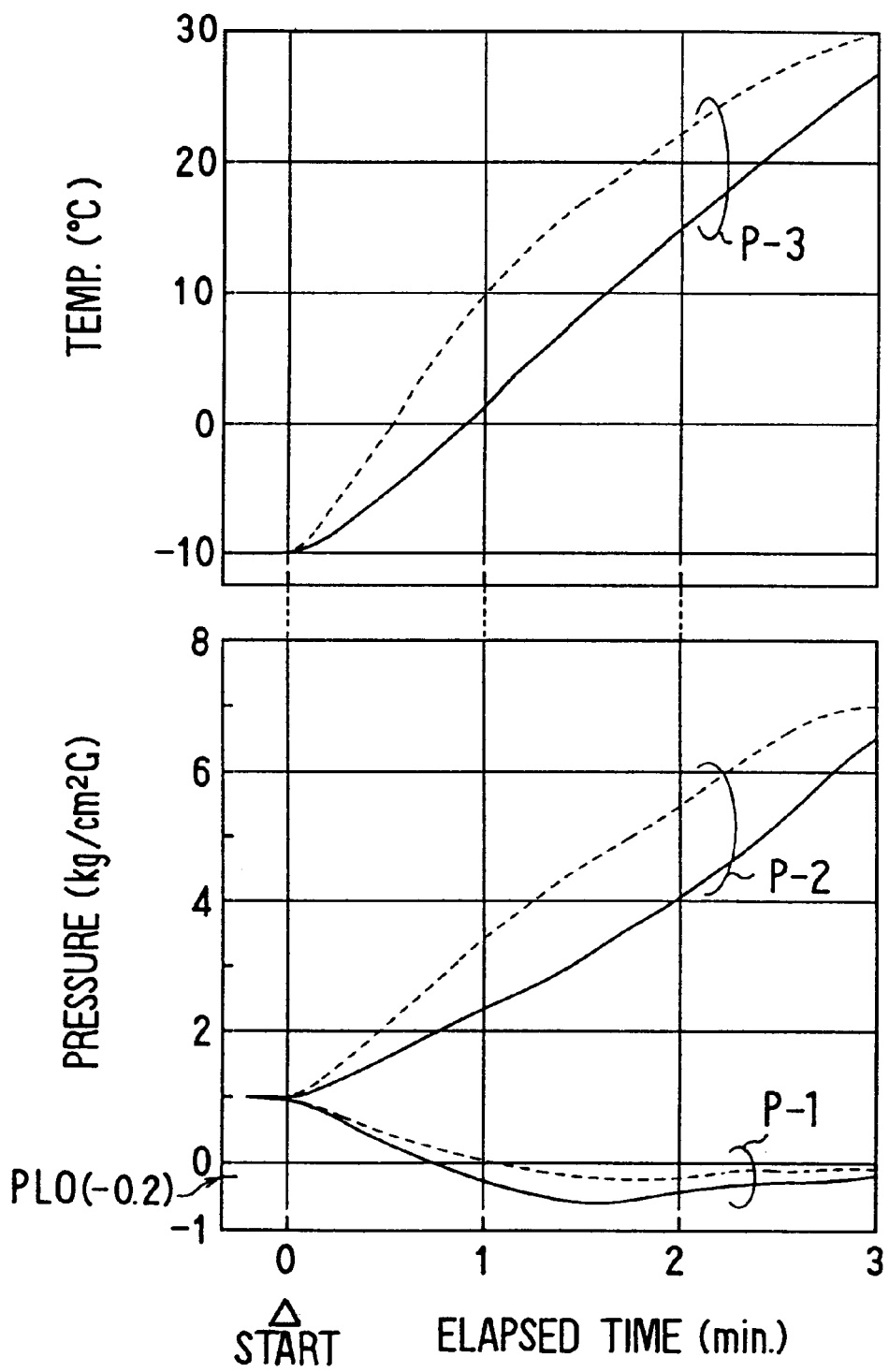
FIG. 25 is a graph showing a relationship between elapsed time since a start of a heating mode and cycle high/low pressure of a refrigeration cycle of a heat pump air conditioner, and a relationship between elapsed time since a start of the heating mode and a temperature of refrigerant discharged from a compressor of the air conditioner according to a thirteenth preferred embodiment of the present invention.

A thirteenth preferred embodiment of the present invention will be described with reference to FIGS. 23 and 25. In FIG. 25, a solid line indicates that the air conditioner was operated in the heating mode, stopped and left for three hours while the outside air temperature Tam was −10° C. and the inside air temperature was 30° C. A broken line indicates that the air conditioner was operated in the heating mode, stopped and left for one hour while the outside air temperature Tam was −10° C. and the inside air temperature was 30° C. In FIG. 25, the deviation rate ΔR of the rotational speed of the compressor 21 at the time of starting the compressor 21 was 150 rpm/sec. and the sealed amount of refrigerant in the refrigeration cycle 20 was 750 g. In FIG. 25, p-1 represents the cycle low pressure, p-2 represents the cycle high pressure, and p-3 represents a temperature of refrigerant discharged from the compressor 21. As shown in FIG. 25, after the air conditioner is restarted, as the cycle high pressure on a discharge side of the compressor 21 and a temperature of refrigerant discharged from the compressor 21 are increased, the cycle low pressure is decreased. As a result, foaming of liquid refrigerant in the separator 24 occurs, thereby causing oil shortage of the compressor 21.

Figure 23:
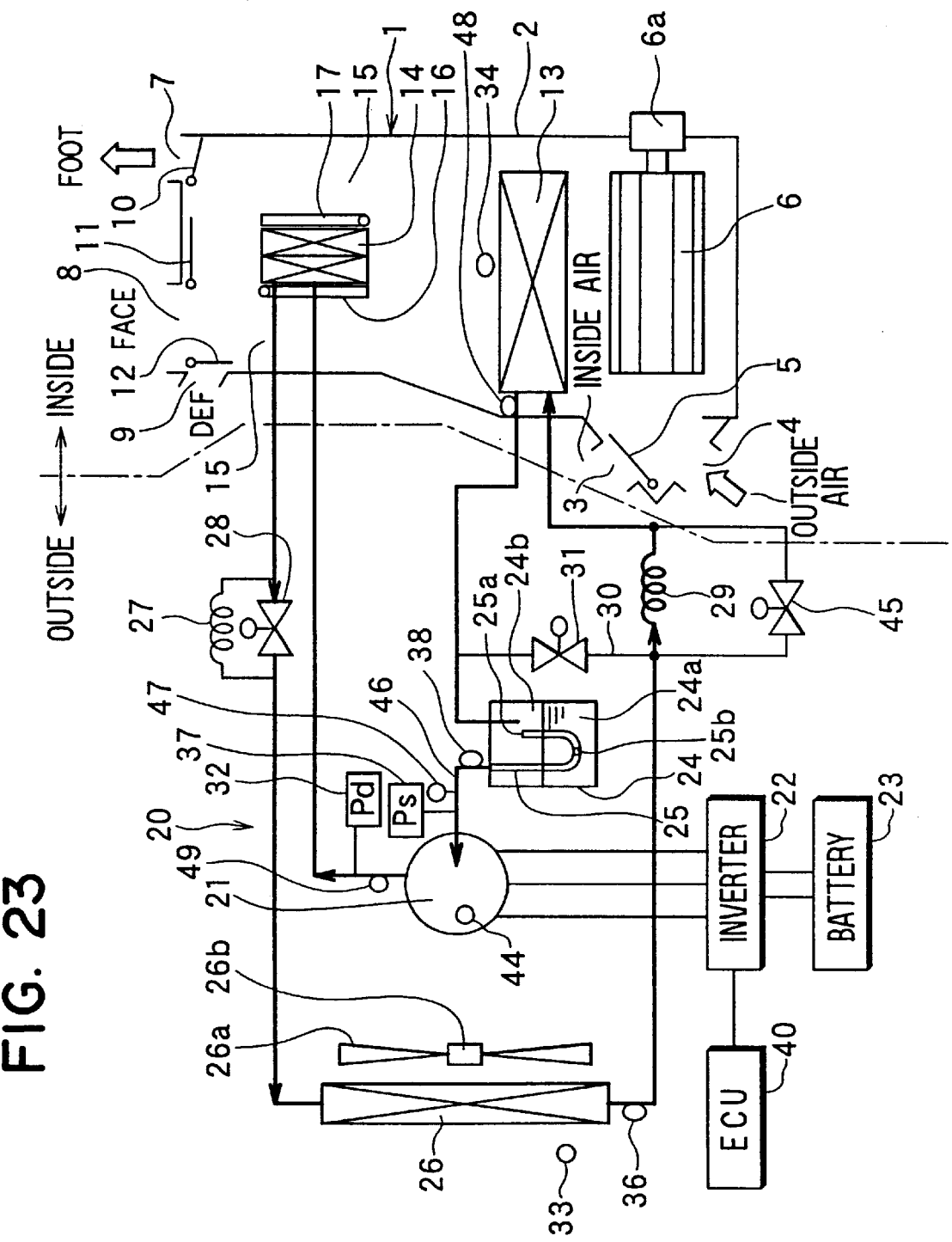
FIG. 23 is a schematic diagram showing the heat pump air conditioner in a heating mode according to the tenth embodiment.

In the thirteenth embodiment, the cycle low pressure is detected by a low pressure sensor 37 in FIG. 23. After the compressor 21 is restarted, when the cycle low pressure continues to be lower than a predetermined value PLO for a predetermined time such as one minute, it is judged that the liquid refrigerant surface in the separator 24 is rapidly lowered toward the oil return hole 25b. In this case, the rotational speed of the compressor 21 is controlled to decrease an amount of refrigerant discharged from the compressor 21. As a result, oil shortage of the compressor 21 is restricted.

The cycle low pressure changes mainly depending on the rotational speed of the compressor 21 and heat load conditions of the air conditioner such as the outside air temperature Tam and the inside air temperature. Therefore, if the predetermined value PLO is corrected according to the rotational speed of the compressor 21 and the heat load conditions, the control according to the thirteenth embodiment corresponds more accurately to change in the rotational speed of the compressor 21 and the heat load conditions. For example, the predetermined value PLO is corrected to be lowered as the outside air temperature Tam is lowered.

Fourteenth Embodiment

A fourteenth preferred embodiment of the present invention will be described with reference to FIGS. 23 and 25. As shown in FIG. 25, the cycle low pressure also changes depending on the cycle high pressure or the temperature of refrigerant discharged from the compressor 21. In the fourteenth embodiment, the cycle high pressure is detected by the high pressure sensor 32 in FIG. 23, or the temperature of refrigerant discharged from the compressor 21 is detected by a temperature sensor 49 in FIG. 23.

When the cycle high pressure detected by the sensor 32 or the temperature of refrigerant discharged from the compressor 21 detected by the sensor 49 continues to be lower than a predetermined value for more than predetermined time, it is judged that the cycle low pressure is lower than the predetermined value PLO. In this case, the rotational speed of the compressor 21 is controlled so that the amount of refrigerant discharged from the compressor 21 is reduced. Each of the cycle high pressure and the temperature of refrigerant discharged from the compressor 21 changes depending on the heat load conditions and the rotational speed of the compressor 21. Therefore, the predetermined value is determined according to the heat load conditions and the rotational speed of the compressor 21 at the moment of detection.

According to the fourteenth embodiment, since detection is performed by the sensors 32, 49, the low pressure sensor 37 does not need to be additionally provided. In the fourteenth embodiment, the rotational speed of the compressor 21 calculated at step S170 in FIG. 5 can be used.

Fifteenth Embodiment

A fifteenth preferred embodiment of the present invention will be described with reference to FIG. 26. When the cycle low pressure is decreased, the cycle high pressure is decreased. When the cycle high pressure is decreased, torque of compressor 21 is decreased, thereby decreasing an output electric current (inverter output current) of the compressor 21.

Figure 26:
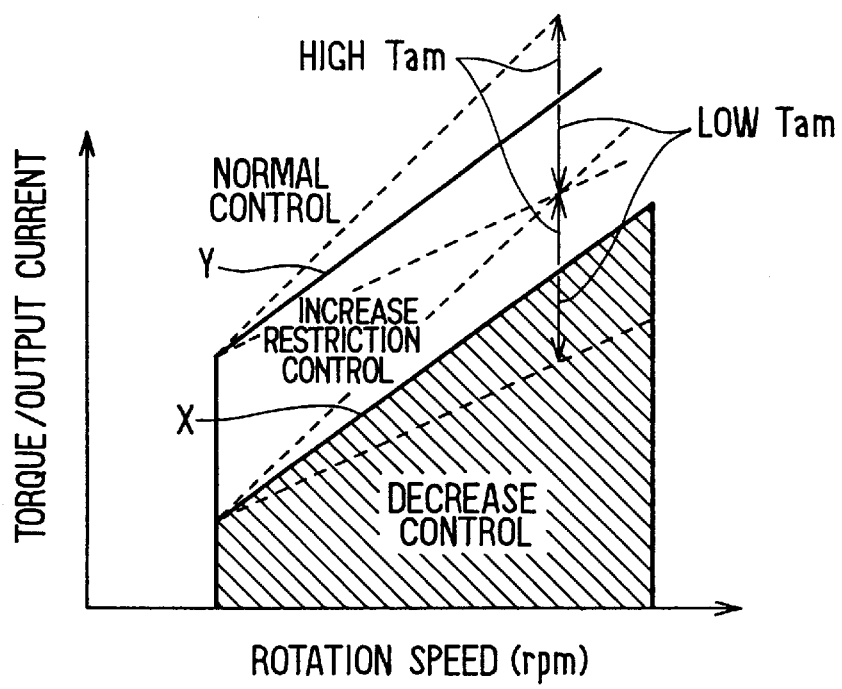
FIG. 26 is a graph showing a relationship between a rotational speed of a compressor of a heat pump air conditioner and torque or output current of the compressor according to a fifteenth preferred embodiment of the present invention.

In the fifteenth embodiment, as shown in FIG. 26, when the output current of the compressor 21 is lower than a first predetermined value X, the rotational speed of the compressor 21 is controlled to be decreased. When the output current of the compressor 21 is between the first predetermined value X and a second predetermined value Y. the rotational speed of the compressor 21 is controlled to be restricted from increasing. When the output current of the compressor 21 is higher than the second predetermined value Y. the rotational speed of the compressor 21 is controlled by the normal control. The first predetermined value X is set smaller than the second predetermined value Y.

The rotational speed of the compressor 21 may be controlled based on a torque of the compressor 21, instead of an output current of the compressor 21. The torque of the compressor 21 is estimated based on operation conditions of the refrigeration cycle 20 such as the cycle high pressure. Further, when the first and second predetermined values X and Y are corrected to be increased or decreased depending on increase or decrease in the outside air temperature Tam, the rotational speed of the compressor 21 can be controlled to correspond more accurately to change in the outside air temperature Tam.

Sixteenth Embodiment

To restrict pulsation of refrigerant discharged from the compressor 21, a discharge side portion of the compressor 21 is formed to be sufficiently larger than a suction side portion of the compressor 21. Further, the compressor 21 is disposed so that a rotation shaft of the compressor 21 is disposed in a horizontal direction to improve mountability of the compressor 21 to the vehicle. As a result, when the refrigeration cycle 20 is stopped and left for certain time, liquid refrigerant tends to be accumulated in the discharge side portion of the compressor 21.

In a sixteenth preferred embodiment of the present invention, a sensor for detecting a height of surface of a liquid refrigerant accumulated in the discharge side portion of the compressor 21 is provided. The sensor may be a similar type as the sensors 39a–39c in FIGS. 17 and 21. When the height of a liquid refrigerant surface in the discharge side portion of the compressor 21 is higher than a predetermined value at the time of starting the compressor 21, the rotational speed of the compressor 21 is controlled so that the amount of refrigerant discharged form the compressor 21 is reduced.

When the amount of the liquid refrigerant accumulated in the discharge side portion of the compressor 21 exceeds the predetermined value, the amount of liquid refrigerant in the separator 24 tends to be decreased at a start of the compressor 21. Therefore, oil shortage of the compressor 21 is restricted by controlling the rotational speed of the compressor 21 according to the amount of liquid refrigerant accumulated in the discharge side portion of the compressor 21.

Seventeenth Embodiment

As a leaving period H of the refrigeration cycle 20 in which the cycle 20 is left after being stopped becomes longer, a temperature Tc of the compressor 21 is lowered toward a temperature proximate the outside air temperature Tam. As the temperature Tc of the compressor 21 becomes lower, heat generated by compression of the compressor 21 is consumed more to increase the temperature Tc of the compressor 21, and it becomes difficult for the discharge pressure of the compressor 21 or the cycle high pressure to increase at the time of restarting the refrigeration cycle 20. As a result, the flow rate of refrigerant in the refrigeration cycle 20 is decreased, thereby causing oil shortage of the compressor 21. Further, when the temperature Tc of the compressor 21 is decreased, the amount of the liquid refrigerant accumulated in the discharge side portion of the compressor 21 is increased while the refrigeration cycle 20 is left after being stopped. This also causes oil shortage of the compressor 21.

In a seventeenth preferred embodiment of the present invention, a difference ΔT between the temperature Tc of the compressor 21 and the outside air temperature Tam is calculated. The rotational speed of the compressor 21 is controlled to reduce the amount of refrigerant discharged from the compressor 21 only when the difference ΔT is smaller than a predetermined value at a start of the compressor 21. It is preferable that a temperature of refrigerant discharged from the compressor 21 or a temperature of a motor of the compressor 21 is detected by the sensor 44 to be used as the temperature Tc of the compressor 21.

The control according to the seventeenth embodiment is effectively applied in the heating mode which is usually set when the outside air temperature Tam is relatively low; however, the control may be applied to the cooling mode and the dehumidification mode. Further, in the heating mode, when the leaving time H of the refrigeration cycle 20 is longer, the temperature Tc of the compressor 21 is more related with the outside air temperature Tam at a restart of the cycle 20. Therefore, in this case, the rotational speed of the compressor 21 may be controlled to reduce the amount of refrigerant discharged from the compressor 21 when it is judged that the temperature Tc is lower than the predetermined value.

Eighteenth Embodiment

An eighteenth preferred embodiment of the present invention will be described with reference to FIG. 27. In the eighteenth embodiment, the rotational speed of the compressor 21 is controlled to reduce the amount of refrigerant discharged from the compressor 21 based on the outside air temperature Tam and the leaving time H of the refrigeration cycle 20.

Figure 27:
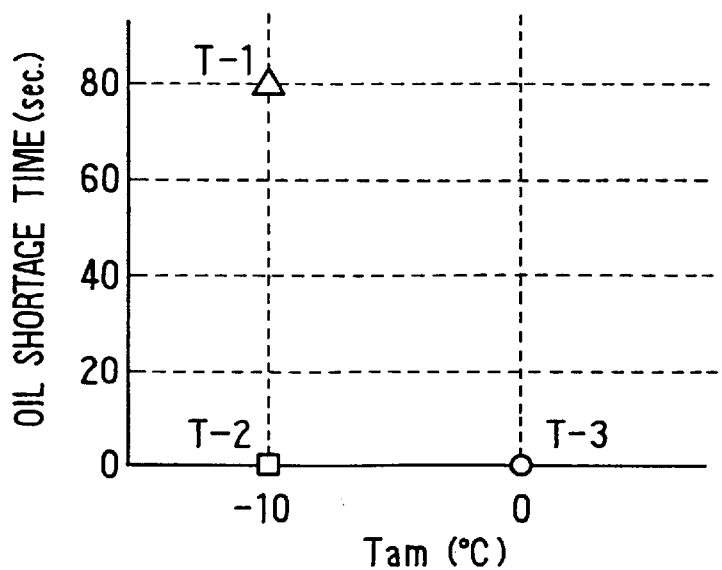
FIG. 27 is a graph showing a relationship between an outside air temperature Tam and oil shortage time of a compressor of a heat pump air conditioner according to an eighteenth preferred embodiment of the present invention.

In FIG. 27, T-1 shows that the air conditioner was operated in the heating mode, stopped and left for three hours while the outside air temperature Tam was –10° C. and the inside air temperature was 30° C. T-2 shows that the air conditioner was operated in the heating mode, stopped and left for one hour while the outside air temperature Tam was –10° C. and the inside air temperature was 30° C. T-3 shows that the air conditioner was operated in the heating mode, stopped and left for three hours while the outside air temperature Tam was 0° C. and the inside air temperature was 30° C. The deviation rate ΔR of the rotational speed of the compressor 21 at the time of starting the compressor 21 was 150 rpm/sec., and the sealed amount of refrigerant in the refrigeration cycle 2 was 750 g for T-1, T-2 and T-3. As shown in FIG. 27, at the time of starting the heating mode, when the outside air temperature Tam is lower or the leaving time H of the refrigeration cycle 20 is longer, the oil shortage time of the compressor 21 is longer.

In the eighteenth embodiment, the rotational speed of the compressor 21 is controlled to reduce the amount of refrigerant discharged from the compressor 21 only when the outside air temperature Tam is low as 0° C. or lower and the leaving time H of the refrigeration cycle 20 is longer than a predetermined time such as one hour. As a result, a frequency of execution of the control of the rotational speed of the compressor 21 is decreased, and hence a delay of increase in a heating ability of the air conditioner can be minimized.

The leaving time H of the refrigeration cycle 20 is related with the oil shortage time of the compressor 21 not only in the heating mode but also in the cooling mode or the dehumidification mode. Therefore, the rotational speed of the compressor 21 may be controlled to reduce an amount of refrigerant discharged from the compressor 21 when it is judged that the leaving time H of the refrigeration cycle 20 is longer than the predetermined time.

Nineteenth Embodiment

In a nineteenth preferred embodiment of the present invention, a variable capacity compressor driven by a driving unit such as a vehicle engine and discharging a variable amount of refrigerant is used as the compressor 21. When the outside air temperature Tam is low as 0° C. or lower, and it is judged that the liquid refrigerant surface in the separator 24 is rapidly lowered at a start of the heating mode, a capacity of the variable capacity compressor is controlled to be decreased. As a result, oil shortage of the compressor 21 is restricted. Also at a start of the cooling mode or the dehumidification mode, oil shortage of the compressor 21 is restricted by reducing the capacity of the compressor 21 in the similar manner.

In the above-mentioned embodiments, the rotational speed of the compressor 21 is controlled so that oil shortage of the compressor 21 is restricted. However, the control according to each of the above-mentioned embodiments may be performed so that the oil shortage time of the compressor 21 is reduced. Further, in the above-mentioned embodiments, both of the cooling evaporator 13 and the heating condenser 14 are provided in the air-conditioning duct 2 as inside heat exchangers. However, the present invention may also be applied to an air conditioner having a single inside heat exchanger which can serve as an evaporator and a condenser in a switchable manner. Also, the present invention is not limited to the heat pump air conditioner for the electric vehicle, but may be applied to various air conditioners such as a stationary air conditioner for a house.

Although the present invention has been fully described in connection with preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. A heat pump air conditioner through which a refrigerant flows, the heat pump air conditioner comprising:
    a compressor for compressing and discharging the refrigerant;
    a first heat exchanger for radiating heat of gas refrigerant discharged from the compressor;
    a decompressing unit for decompressing the refrigerant having passed through the first heat exchanger;
    a second heat exchanger for evaporating the refrigerant having passed through the decompressing unit; and
    a separator for separating the refrigerant having passed through the second heat exchanger into gas refrigerant and liquid refrigerant and storing the liquid refrigerant therein, the separator having a gas suction pipe through which the gas refrigerant in the separator is sucked into the compressor, the gas suction pipe having an oil return hole through which at least oil is sucked and mixed with the gas refrigerant to be returned into the compressor, the oil return hole being formed at a bottom of the gas suction pipe; and
    a control unit for controlling an operation of the compressor, the control unit having judging means for judging whether a specific condition that a surface of the liquid refrigerant in the separator is rapidly lowered toward the oil return hole is satisfied, wherein:
        the control unit decreases an amount of the refrigerant discharged from the compressor to a value smaller than that in a normal state at the time of starting the compressor, when the judging means judges that the specific condition is satisfied.

2. The heat pump air conditioner according to claim 1, wherein the compressor is an electric compressor which adjusts an amount of the refrigerant discharged therefrom by adjusting a rational speed thereof.

3. The heat pump air conditioner according to claim 2, wherein the control unit decreases a deviation rate of the rational speed of the compressor to a value smaller than that in the normal state at the time of starting the compressor, when the judging means that the specific condition is satisfied.

4. The heat pump air conditioner according to claim 2, wherein the control unit temporarily restricts an increase of the rotational speed of the compressor when the judging means judges that the specific condition is satisfied.

5. The heat pump air conditioner according to claim 2, wherein:
    the control unit restricts an increase of the rotational speed of the compressor when the judging means judges that the specific condition is satisfied to a first degree; and
    the control unit decreases the rotational speed of the compressor when the judging means judges that the specific condition is satisfied to a second degree.

6. The heat pump air conditioner according to claim 1, wherein the compressor is a variable capacity compressor which adjusts an amount of the refrigerant discharged therefrom by adjusting a capacity thereof.

7. The heat pump air conditioner according to claim 1, wherein:
    the first heat exchanger is an interior heat exchanger disposed inside an interior space, and the second heat exchanger is an exterior heat exchanger disposed outside the interior space; and
    air heated by the first heat exchanger is blown into the interior space to heat the interior space.

8. The heat pump air conditioner according to claim 7, wherein the judging means judges that the specific condition is satisfied when a temperature of air outside the interior space is lower than a predetermined value.

9. The heat pump air conditioner according to claim 7, wherein the judging means judges that the specific condition is satisfied, when a temperature of air outside the interior space is lower than a predetermined value and the compressor is left for a period longer than a predetermined period after being stopped.

10. The heat pump air conditioner according to claim 7, wherein the judging means judges that the specific condition is satisfied, when a temperature of the compressor is lower than a predetermined value.

11. The heat pump air conditioner according to claim 7, wherein the judging means judges that the specific condition is satisfied when a temperature difference between a temperature of the compressor and a temperature of air outside the interior space is smaller than a predetermined value.

12. The heat pump air conditioner according to claim 1, wherein the judging means judges that the specific condition is satisfied, when a supercooling degree of the refrigerant discharged from the separator continues to be higher than a predetermined value for a period longer than a predetermined period.

13. The heat pump air conditioner according to claim 1, wherein the judging means judges that the specific condition is satisfied, when a supercooling degree of the refrigerant discharged from the second heat exchanger continues to be higher than a predetermined value for a period longer than a predetermined period.

14. The heat pump air conditioner according to claim 1, further comprising:
a pressure sensor for detecting a low pressure in a low pressure passage disposed between the second heat exchanger and the separator, wherein:
the judging means judges that the specific condition is satisfied when the low pressure detected by the pressure sensor continues to be lower than a predetermined value for a period longer than a predetermined period.

15. The heat pump air conditioner according to claim 14, wherein:
the first heat exchanger is an interior heat exchanger disposed inside an interior space, and the second heat exchanger is an exterior heat exchanger disposed outside the interior space; and
the predetermined value is decreased as a temperature of air outside the interior space is decreased.

16. The heat pump air conditioner according to claim 1, further comprising:
a pressure sensor for detecting a high pressure in a high pressure passage communicating with the first heat exchanger, wherein:
the judging means judges that the specific condition is satisfied, when the high pressure detected by the pressure sensor continues to be lower than a predetermined value which depends on a heat load condition and a rotational speed of the compressor for a period longer than a predetermined period.

17. The heat pump air conditioner according to claim 1, wherein the judging means judges that the specific condition is satisfied, when a temperature of the refrigerant discharged from the compressor continues to be lower than a predetermined value which depends on a heat load condition and a rotational speed of the compressor for a period longer than a predetermined period.

18. The heat pump air conditioner according to claim 1, wherein the judging means judges that the specific condition is satisfied when the surf ace of the liquid refrigerant in the separator is lower than a predetermined position.

19. The heat pump air conditioner according to claim 18, wherein the judging means judges that the specific condition is satisfied, when a value related to a torque of the compressor is lower than a predetermined value which depends on a rotational speed of the compressor.

20. The heat pump air conditioner according to claim 1, wherein the judging means judges that the specific condition is satisfied when the surface of the liquid refrigerant in the separator is lowered at a speed higher than a predetermined value.

21. The heat pump air conditioner according to claim 1, wherein the judging means judges that the specific condition is satisfied when the compressor is left for a period longer than a predetermined period after being stopped.

22. The heat pump air conditioner according to claim 1, wherein the judging means judges that the specific condition is satisfied, when an amount of the refrigerant sucked into the compressor continues to be larger than a predetermined value for a period longer than a predetermined period and then is decreased to become smaller than the predetermined value.

23. The heat pump air conditioner according to claim 1, wherein:
the compressor has a discharge side portion in which the liquid refrigerant is accumulated; and
the judging means Judges that the specific condition is satisfied when a surface of the liquid refrigerant accumulated in the discharge side portion of the compressor is higher than a predetermined position.

24. A heat pump air conditioner through which a refrigerant flows, the heat pump air conditioner comprising:
a compressor for compressing and discharging a refrigerant;
a first heat exchanger for radiating heat of the gas refrigerant discharged from the compressor;
a decompressing unit for decompressing the refrigerant having passed through the first heat exchanger, the decompressing unit having a throttle portion with a fixed opening degree;
a second heat exchanger for evaporating the refrigerant having passed through the decompressing unit;
a separator for separating the refrigerant having passed through the second heat exchanger into gas refrigerant and liquid refrigerant and storing the liquid refrigerant therein, the separator having a gas suction pipe through which the gas refrigerant in the separator is sucked into the compressor, the gas suction pipe having an oil return hole through which at least oil is sucked and mixed with the gas refrigerant to be returned into the compressor, the oil return hole being formed at a bottom of the gas suction pipe; and
a control unit for controlling an operation of the compressor, the control unit having judging means for judging whether a specific condition that a surface of the liquid refrigerant in the separator is rapidly lowered toward the oil return hole is satisfied, wherein:
the control unit forces the refrigerant to flow bypassing the decompressing unit at the time of starting the compressor when the judging means judges that the specific condition is satisfied.

25. A heat pump air conditioner through which a refrigerant flows, the heat pump air conditioner comprising:
a compressor for compressing and discharging a refrigerant;
a first heat exchanger for radiating heat of the gas refrigerant discharged from the compressor;
a decompressing unit for decompressing the refrigerant having passed through the first heat exchanger, the decompressing unit having a throttle portion with a variable opening degree;
a second heat exchanger for evaporating the refrigerant having passed through the decompressing unit;
a separator for separating the refrigerant having passed through the second heat exchanger into gas refrigerant and liquid refrigerant and storing the liquid refrigerant therein, the separator having a gas suction pipe through which the gas refrigerant in the separator is sucked into the compressor, the gas suction pipe having an oil return hole through which at least oil is sucked and mixed with the gas refrigerant to be returned into the compressor, the oil return hole being formed at a bottom of the gas suction pipe; and a control unit for controlling an operation of the compressor, the control unit having judging means for judging whether a specific condition that a surface of the liquid refrigerant in the separator is rapidly lowered toward the oil return hole is satisfied, wherein:

the control unit increases the opening degree of the throttle portion to a value larger than that in a normal state at the time of starting the compressor when the judging means judges that the specific condition is satisfied.

* * * * *

UNITED STATES PATENT AND TRADEMARK OFFICE
CERTIFICATE OF CORRECTION

PATENT NO. : 6,314,750 B1 Page 1 of 1
DATED : November 13, 2001
INVENTOR(S) : Hiroshi Ishikawa et al.

It is certified that error appears in the above-identified patent and that said Letters Patent is hereby corrected as shown below:

<u>Title page,</u>
Item [30], Foreign Application Priority Data,

"(JP) 12-083264" should be -- (JP) 2000-083264 --

Signed and Sealed this

Twenty-seventh Day of August, 2002

Attest:

JAMES E. ROGAN
*Attesting Officer*     *Director of the United States Patent and Trademark Office*